United States Patent [19]

Yamada et al.

[11] Patent Number: 5,154,100
[45] Date of Patent: Oct. 13, 1992

[54] SYSTEM FOR CONTROLLING AUTOMATIC POWER TRANSMISSION

[75] Inventors: Toshiharu Yamada; Kenichi Sakamoto; Hiroki Suzuki, all of Shizuoka, Japan

[73] Assignee: Japan Automatic Transmission Co., Ltd., Fuji, Japan

[21] Appl. No.: 730,391

[22] Filed: Jul. 15, 1991

Related U.S. Application Data

[63] Continuation of Ser. No. 304,488, Feb. 1, 1989, abandoned.

[30] Foreign Application Priority Data

| Feb. 1, 1988 | [JP] | Japan | 63-011123[U] |
| Feb. 1, 1988 | [JP] | Japan | 63-011124[U] |
| Feb. 1, 1988 | [JP] | Japan | 63-019625 |
| Feb. 1, 1988 | [JP] | Japan | 63-019626 |
| Feb. 1, 1988 | [JP] | Japan | 63-019627 |
| Feb. 1, 1988 | [JP] | Japan | 63-019628 |
| Feb. 1, 1988 | [JP] | Japan | 63-019629 |
| Feb. 1, 1988 | [JP] | Japan | 63-019630 |
| Feb. 1, 1988 | [JP] | Japan | 63-019631 |

[51] Int. Cl.⁵ .............................................. B60K 41/06
[52] U.S. Cl. ....................................... 74/868; 74/866
[58] Field of Search ................ 74/866, 867, 868, 869

[56] References Cited

U.S. PATENT DOCUMENTS

| 4,721,018 | 1/1988 | Harada et al. | 74/867 X |
| 4,722,251 | 2/1988 | Sumiya et al. | 74/867 X |
| 4,753,134 | 6/1988 | Hayasaki | 74/866 |
| 4,807,496 | 2/1989 | Hayasaki et al. | 74/867 X |
| 4,843,920 | 7/1989 | Hayasaki et al. | 74/869 |
| 4,879,925 | 11/1989 | Taga et al. | 74/869 X |
| 4,881,429 | 11/1989 | Kobayashi et al. | 74/867 |
| 4,893,527 | 1/1990 | Farnsawa | 74/866 |

FOREIGN PATENT DOCUMENTS

| 57-101152 | 6/1982 | Japan . |
| 59-180149 | 10/1984 | Japan . |
| 59-183150 | 10/1984 | Japan . |

*Primary Examiner*—Richard Lorence
*Assistant Examiner*—Benjamin Levi
*Attorney, Agent, or Firm*—Foley & Lardner

[57] ABSTRACT

An automatic power transmission control system includes a solenoid valve which is associated with an electric or electronic controller to receive therefrom a control signal. The solenoid valve generates a hydraulic control pressure in response to the control signal. The solenoid valve supplies the control pressure to a shift valve for switching shift valve position between a higher gear position and a lower gear position. The solenoid valve is also hydraulically communicated with a hydraulic device which performs desired operations associated with gear position shifting operation. The solenoid valve supplies the control pressure to the hydraulic device for controlling operation of the latter corresponding to the selected gear position.

10 Claims, 15 Drawing Sheets

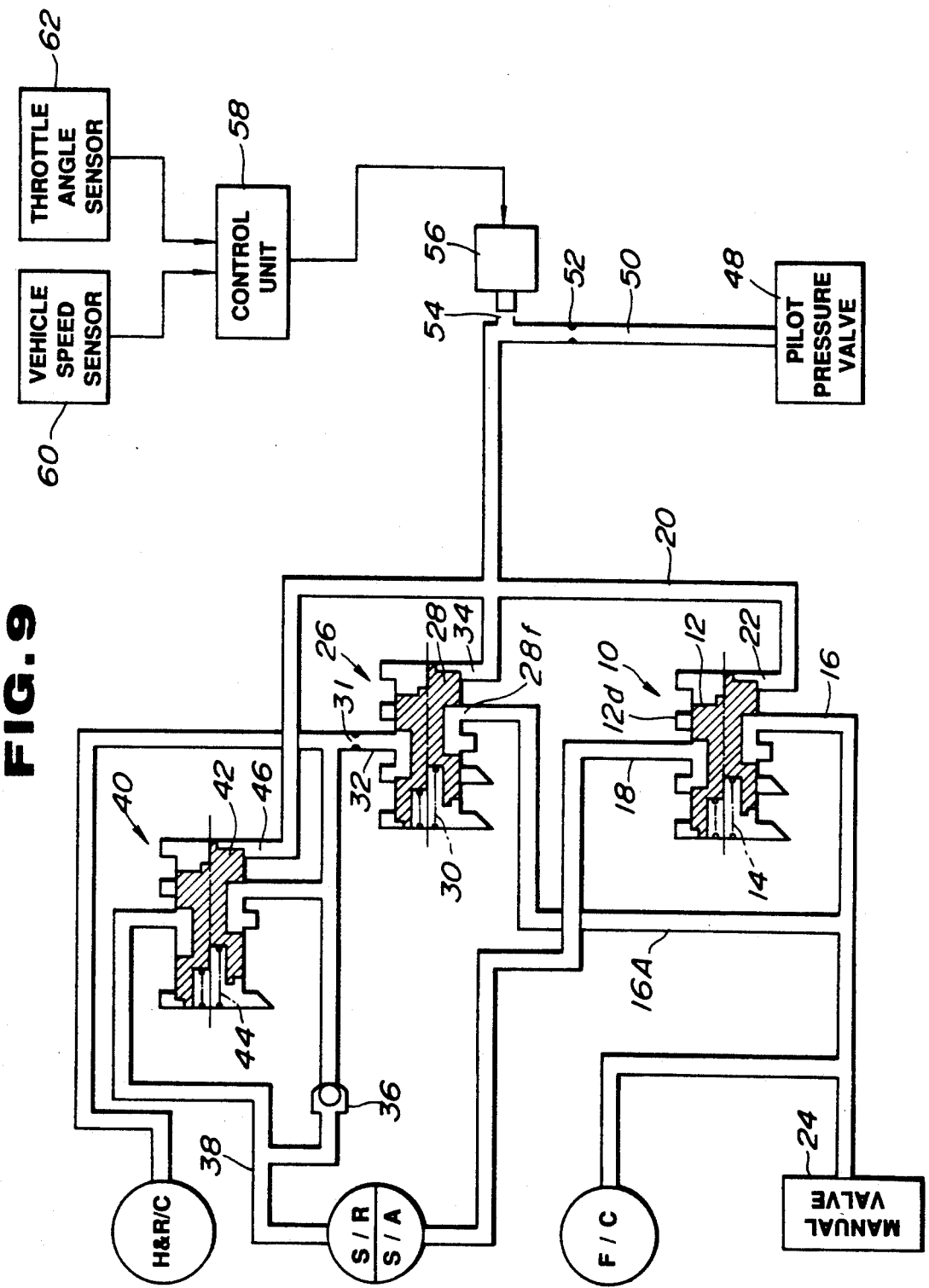

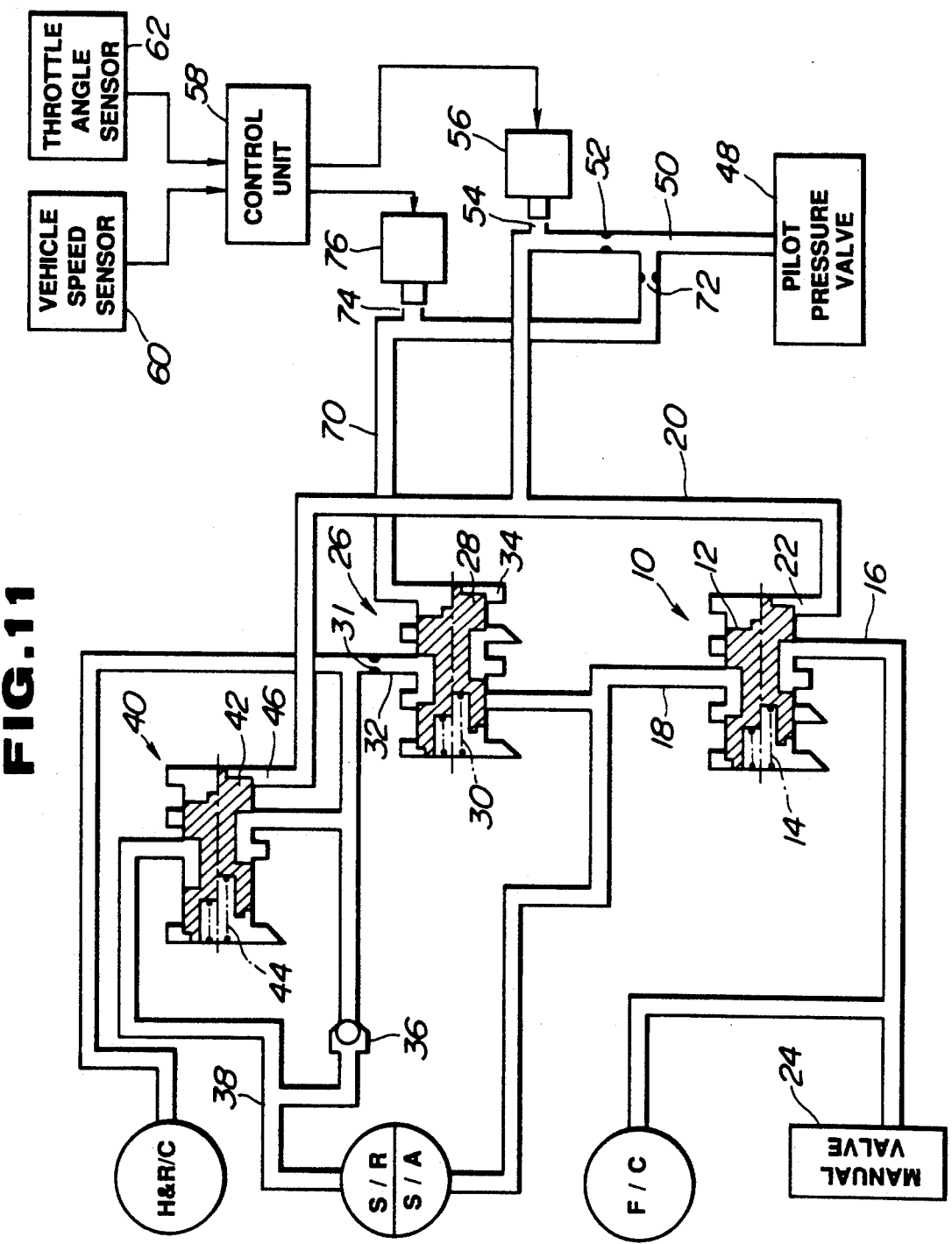

| | | R/C | H/C | F/C | O/C | B | L&R/B | FOWC | OWC | GEAR RATIO | $\alpha_1 = 0.440$ $\alpha_2 = 0.493$ |
|---|---|---|---|---|---|---|---|---|---|---|---|
| D RANGE | 1st | | | ○ | | | | ○ | ○ | $\dfrac{1+\alpha_2}{\alpha_2}$ | 3.027 |
| | 2nd | | | ○ | | ○ | | ○ | | $\dfrac{\alpha_1+\alpha_2+\alpha_1\alpha_2}{\alpha_2(1+\alpha_1)}$ | 1.619 |
| | 3rd | ○ | ○ | | | | | ○ | | 1 | 1.000 |
| | 4th | | ○ | (○) | ○ | | | | | $\dfrac{1}{1+\alpha_1}$ | 0.694 |
| ENGINE BRAKING STATE | 1st | | | (○) | ○ | | ○ | (○) | (○) | | |
| | 2nd | | | (○) | ○ | ○ | | (○) | | | |
| | 3rd | ○ | (○) | ○ | | | | (○) | | | |
| | 4th | | ○ | (○) | ○ | | | | | | |
| REVERSE | | ○ | | | | | ○ | | | $-\dfrac{1}{\alpha_1}$ | -2.272 |

( ) IS IRRESPECTIVE OF POWER TRANSMISSION

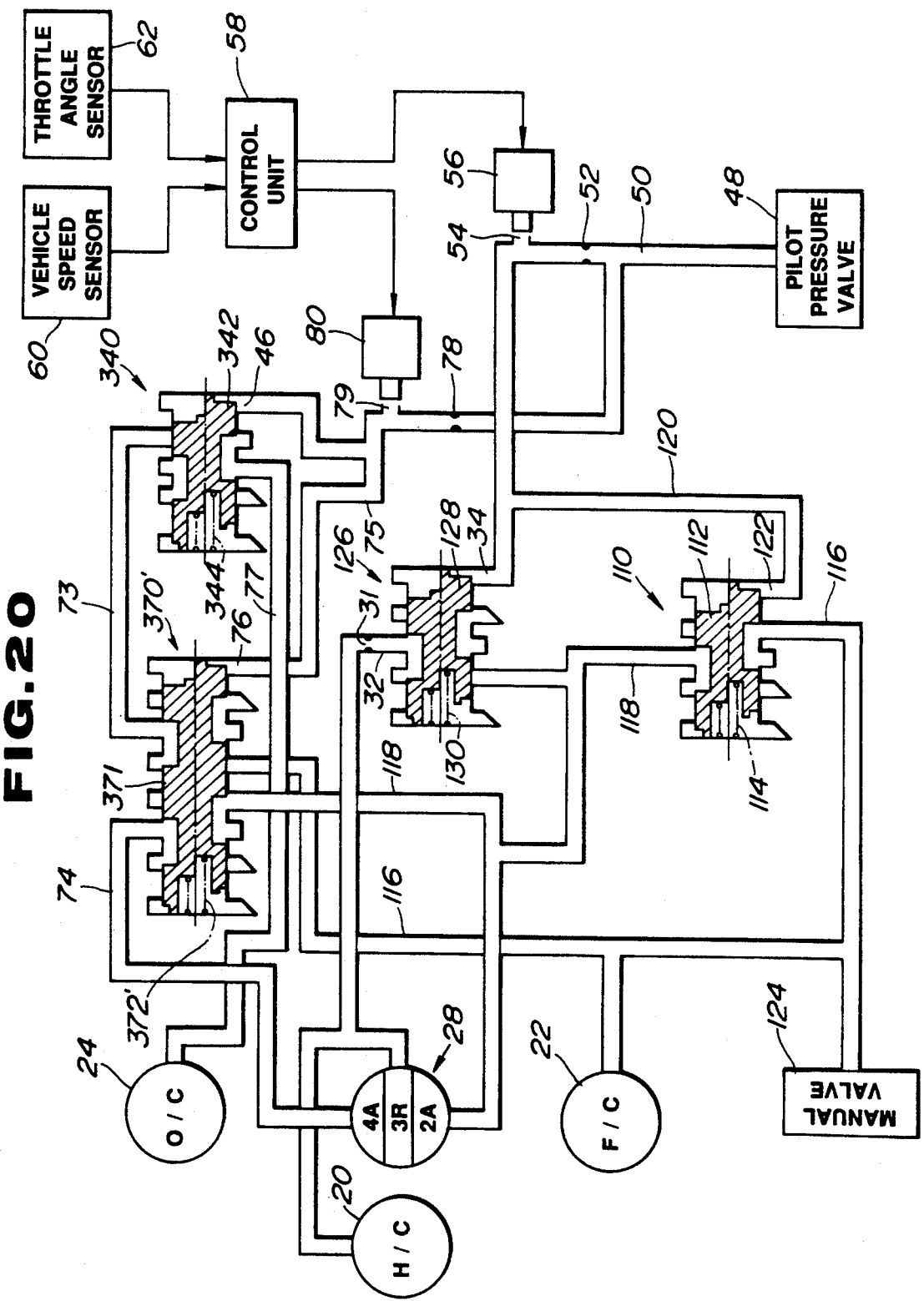

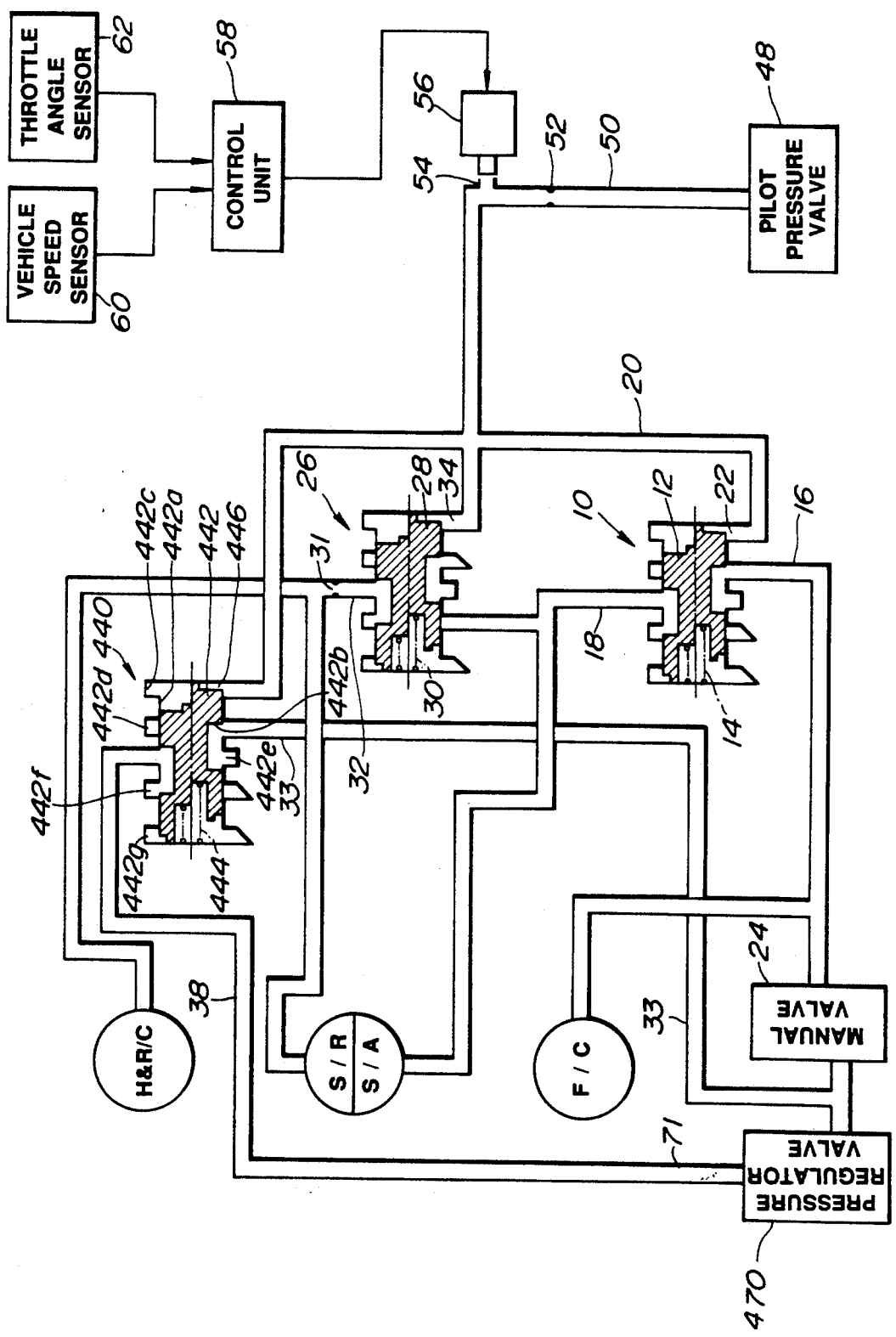

SYSTEM FOR CONTROLLING AUTOMATIC POWER TRANSMISSION

This application is a continuation of application Ser. No. 07/304,488, filed Feb. 1, 1989 now abandoned.

BACKGROUND OF THE INVENTION

1. Field of the Invention

The present invention relates generally to a control system for an automotive automatic power transmission. More particularly, the invention relates to an automatic power transmission control system with simplified hydraulic circuit construction.

2. Description of the Background Art

Japanese patent First (unexamined) Publication (Tokkai) Showa 57-101152 discloses a control system for an automatic power transmission. The control system includes a solenoid valve designed for selecting or shifting gear position among four forward gear positions. For this, the shown solenoid valve generates mutually different four control pressures for controlling positions of shift valves. In the shown construction, four shift valves, i.e. 1-2 shift valve, 2-3 shift valve, 3-4 shift valve and 4th gear position clutch control valve, are provided in the hydraulic circuit of the automatic transmission. Respective four shift valves are adapted to respond to respectively corresponding ones of the control pressure to switch valve position.

Generally, the modern automatic power transmission includes various hydraulically operated devices for achieving various control functions. For example, one of the typical construction of the automatic power transmission includes a lock-up clutch control valve, a cut-back valve, a timing valve or valves, an overrunning clutch control valve and so forth. While the facilitating of various hydraulic devices such as that set forth above achieves additional functions in the automatic power transmission, the hydraulic circuit for controlling these hydraulic devices becomes more and more complicated to cause difficulty in designing and prevents a hydraulic control system from being constructed in a compact manner. For example, in the construction shown in the aforementioned Tokkai Showa 57-101152, another solenoid valve is required for controlling a lock-up clutch which is associated with a torque converter for establishing and releasing lock-up condition.

To simplify the construction of the hydraulic circuit, Japanese Patent First (unexamined) publication (Tokkai) Showa 59-183150 discloses a shift control solenoid valve which is commonly used for controlling a lock-up clutch control valve. In the shown construction, the shift control solenoid valve controls shift valves between a first gear position, -second gear position and a third gear position. In addition to this, the solenoid valve performs control operations for a lock-up clutch control valve for establishing and releasing a lock-up condition, while the shift valve is set at the third gear position. For facilitating this, the shift valve is constructed to be placed at the third gear position while no shift control pressure is exerted. With the shown construction, lock-up can be established only at the third gear position and cannot achieve full range lock-up control.

Furthermore, in the control system of the aforementioned Tokkai Showa 59-183150, difficulty is encountered in appropriately adjusting shift timing. In the shown control system, four mutually different control pressures are to be generated by the solenoid valve. Therefore, considering shifting from third gear position to second gear position, there are required two different pressure adjusting operations because 1-2 gear shift valve position is alternated between the lock-up released third gear position and lock-up third gear position. When the shift position is in the lock-up third gear position, the 1-2 shift valve is set at the second gear position, in which control pressure is exerted in an application chamber of a band servo device. On the other hand, when the shift position is in the lock-up released third gear position, the 1-2 shift valve is set at the first gear position, in which control pressure is not exerted in the application chamber of the band servo device. Therefore, in the latter case, the shifting operation from third gear position to second gear position is performed by draining pressure in a release chamber of the band servo device and by supplying the pressure to the application chamber. On the other hand, in the former case, it is only required to drain the pressure in the release chamber. In this connection, shift timing in the former case and the latter case has to be differentiated. For appropriately adjusting the shift timing, it becomes necessary for detecting not only the shift position but also lock-up clutch position.

On the other hand, Japanese Patent First (unexamined) publication (Tokkai) Showa 59-180149 discloses an automatic transmission control system which includes a pressure regulator valve, a cut-back valve, shift valves and solenoid valves. One solenoid valve is associated with an 1-2 shift valve for shifting gear position between first gear position and second gear position. The 1-2 shift valve is hydraulically communicated with the cut-back valve so that the cut-back valve can be indirectly controlled by the control pressure from the solenoid valve. However, since such construction cooperatively operates the 1-2 shift valve and the cut-back valve, lag in lowering line pressure tends to occur to cause uncomfortable shift shock. Namely, when lag in pressure adjustment in the pressure regulator valve occurs, the 1-2 shift valve starts to switch the valve position between first and second gear positions before the line pressure is sufficiently lowered for suppressing shift shock.

SUMMARY OF THE INVENTION

Therefore, it is a principle object of the present invention to simplify the construction of a hydraulic circuit for controlling an automatic power transmission by employing a solenoid valve which can commonly and effectively control at least two mutually different type of hydraulic devices.

Another object of the invention is to provide an automatic transmission control system which has a solenoid valve controlling both of shift valve or valves and a lock-up clutch valve without causing difficulty in adjusting shift timing.

A further object of the invention is to provide an automatic transmission control system which has a solenoid valve effectively controlling both of the shift valve or shift valves and a timing valve without causing difficulty in adjusting shift timing to suppress shift shock without fail.

A still further object of the invention is to provide an automatic transmission control system which has a solenoid valve effectively controlling both of the shift valve or shift valves and a cut-back valve for suppressing shift shock.

A yet further object of the invention is to provide an automatic transmission control system which has a solenoid valve for controlling both of the shift valve or shift valves and a over-run clutch control valve for suppressing shock.

In order to accomplish the aforementioned and other objects, an automatic power transmission control system, according to the present invention, includes a solenoid valve which is associated with an electric or electronic controller to receive therefrom a control signal. The solenoid valve generates a hydraulic control pressure in response to the control signal. The solenoid valve supplies the control pressure to a shift valve for switching shift valve position between a higher gear position and a lower gear position. The solenoid valve is also hydraulically communicated with a hydraulic device which performs desired operation associated with gear position shifting operation. The solenoid valve supplies the control pressure to the hydraulic device for controlling operation of the latter corresponding to the selected gear position.

According to one aspect of the invention, a control system for an automatic power transmission, comprises:

a hydraulic circuit associated with a transmission gear assembly for hydraulically performing gear shift operation at least between a higher gear position and a lower gear position;

a first valve means disposed within the hydraulic circuit and movable between a first position corresponding to the higher gear position and a second position corresponding to the lower gear position, the first control valve means being responsive to a pilot pressure in a first pilot chamber for shifting of valve position between the first and the second positions according to variation of pilot pressure across a first set pressure;

a second valve means disposed within the hydraulic circuit for performing control of automatic transmission operation associated with transmission gear shifting operation, the second valve means being responsive to a pilot pressure in a second pilot chamber for shifting between a first position activating an associated transmission component and a second position deactivating the associated transmission component according to variation of the pilot pressure varying across a second set pressure; and third means for selectively generating a first, second and third pressure level pilot pressure to be supplied to the first and second valve means for operating the first and second valve means to a desired positions.

According to another aspect of the invention, a control system for an automatic power transmission, comprises:

a hydraulic circuit associated with a transmission gear assembly for hydraulically performing gear shift operation at least between a higher gear position and a lower gear position;

a first valve means disposed within the hydraulic circuit and movable between a first position corresponding to the higher gear position and a second position corresponding to the lower gear position, the shift control valve being responsive to a pilot pressure in a first pilot chamber to shifting of valve position between the first and the second positions according to variation of pilot pressure across a first set pressure;

a second valve means disposed within the hydraulic circuit for performing control of automatic transmission operation associated with transmission gear shifting operation, the second valve means being responsive to a pilot pressure in a second pilot chamber for shifting between a first position activating an associated transmission component and a second position deactivating the associated transmission component according to variation of the pilot pressure varying across a second set pressure; and third means for selectively generating a first, second and third pressure level pilot pressure to be supplied to the first and second valve means for operating the first and second valve means to a desired positions, the third means varying one of the second and third pilot pressure to the pressure level of the first pilot pressure which switches valve position of the first valve means, and subsequently vary the other of the second and third pilot pressure.

In the preferred construction, the third means comprises an electrically operable component and a hydraulically operable component cooperating each other for converting an electric signals representative of the first, second and third pressure levels into the corresponding hydraulic pressure. The electrically operable component comprises a sensor for monitoring a vehicle driving condition, a controller detecting the vehicle driving condition on the basis of the sensor signal and producing a control signal commanding one of the first, second and third pressure levels. The electrically operable component includes a solenoid valve which is duty controlled the energized period and deenergized period for converting the signal value of the control signal into corresponding hydraulic pressure.

In one example, the second valve means comprises a lock-up control valve associated with a lock-up clutch for establishing and releasing lock-up. In such case, the first valve means valve is responsive to the first level pilot pressure which is lower than the first set pressure to select the lower gear position and to the second level pilot pressure which is higher than the first set pressure and lower than the second set pressure to select the higher gear position, and the lock-up clutch control signal maintains the lock-up clutch at disengaged position when the pilot pressure is maintained at the first and second level and responsive to the pilot pressure at the third level higher than the second set pressure to cause engagement of the lock-up clutch to establish lock-up. In the alternative, The look-up clutch control valve is responsive to the pilot pressure at the first level to maintain the lock-up clutch at disengaged position, responsive to the pilot pressure at the second level to cause engagement of the lock-up clutch to establish lock-up, and further responsive to the pilot pressure at the third level higher than the second set pressure for causing disengagement of the lock-up clutch for releasing lock-up.

In the alternative example, the second valve means comprises a timing valve for controlling shift timing. In this case, the first valve means valve is responsive to the first level pilot pressure which is lower than the first set pressure and higher than the second set pressure to select the lower gear position and to the second level pilot pressure which is higher than the first set pressure to select the higher gear position, and the timing control valve is responsive to first and second level pilot signal to disable shifting from the higher gear position to lower gear position and to the third level pilot pressure lower than the second set pressure to permit shifting from the higher gear position to lower gear position.

Alternatively, the timing control valve is responsive to first and second level pilot signal to disable shifting from the lower gear position to higher gear position or to lower shifting speed, and to the third level pilot pressure higher than the second set pressure to permit higher speed shifting from the lower gear position to higher gear position.

The third means may maintain the pilot pressure at the first level when decreased from the second level for a given period so that the transmission gear position is maintained at neutral position during the given period or so that shifting speed is lowered for the given period. Alternatively, the third means may maintain the pilot pressure at the second level when increased from the first level for a given period so that the transmission gear position is maintained at neutral position during the given period or so that shifting speed is lowered for the given period.

In the further alternative, the second valve means comprises an overrun clutch control valve associated with an overrun clutch. In this case, the first valve means valve is responsive to the first level pilot pressure which is lower than the first set pressure to select the lower gear position and to the second level pilot pressure which is higher than the first set pressure and lower than the second set pressure to select the higher gear position, and the overrun clutch control valve is responsive to the pilot pressure at the first and second level to maintain the overrun clutch at engaged position, and responsive to the pilot pressure at the third level higher than the second set pressure to cause disengagement of the overrun clutch.

As a further alternative, the second valve means may comprise a cut-back valve for adjusting line pressure. The first valve means valve is responsive to the first level pilot pressure which is lower than the first set pressure to select the higher gear position and to the second level pilot pressure which is higher than the first set pressure and lower than the second set pressure to select the lower gear position, and the cut-back valve is responsive to the pilot pressure at the first and second level to maintain the line pressure at the lower level, and responsive to the pilot pressure at the third level higher than the second set pressure to adjust the line pressure at higher level.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 9 is a schematic circuit diagram of a modification of the second embodiment of the automatic transmission control system of FIG. 7;

FIG. 11 is a schematic circuit diagram of another modification of the second embodiment of the automatic transmission control system of FIG. 7;

FIG. 20 is a schematic circuit diagram of a further modification of the third embodiment of the automatic transmission control system of FIG. 16;

FIG. 21 is a schematic circuit diagram of the fourth embodiment of the automatic transmission control system;

DESCRIPTION OF THE PREFERRED EMBODIMENT

Figure 1:
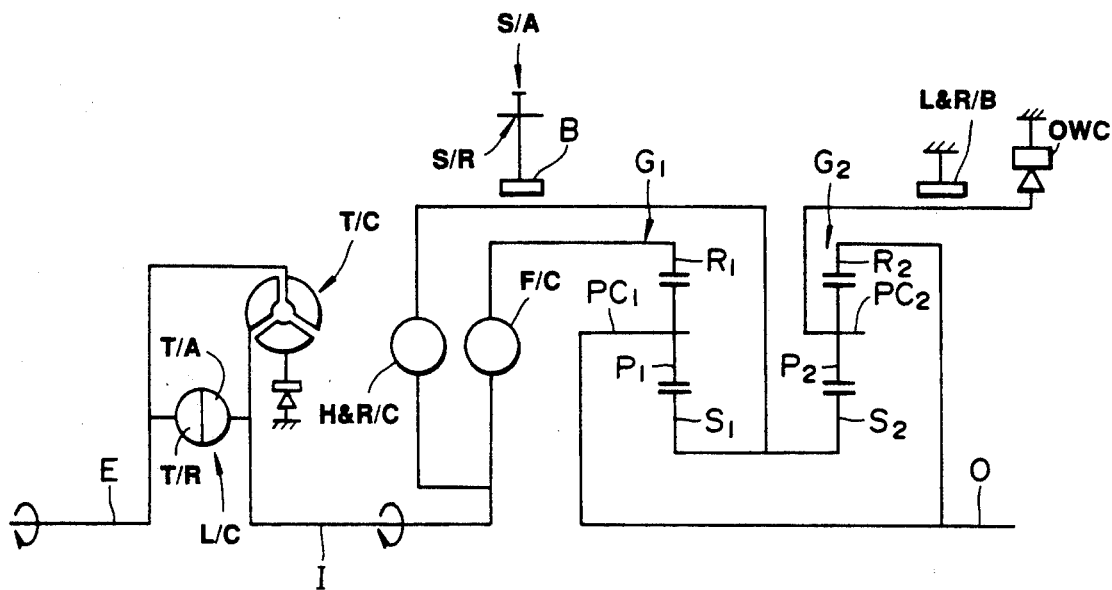
FIG. 1 is a schematic drive line diagram of a power transmission mechanism of an automatic power transmission to which the first embodiment of an automatic transmission control system according to the present invention is applied.
Figure 2:
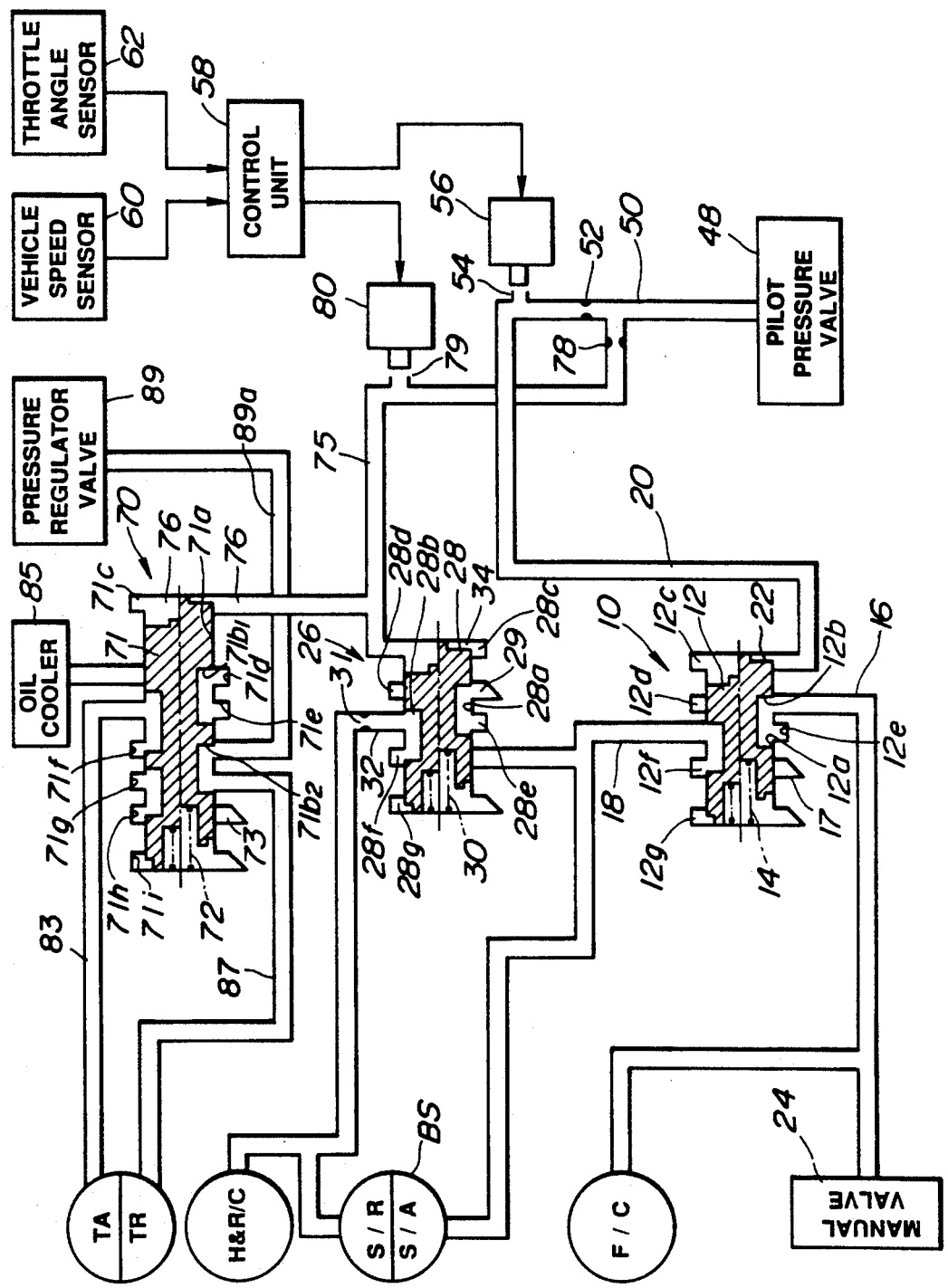
FIG. 2 is a schematic circuit diagram of the first embodiment of the automatic transmission control system according to the present invention.

Referring now to the drawings, particularly to FIGS. 1 and 2, the first embodiment of an automatic transmission mechanism according to the invention is applied for an automatic power transmission which has a power transmission mechanism as shown in FIG. 1. The shown power transmission mechanism is designed for shifting forward three stage gear positions and one reverse gear position. The power transmission mechanism includes a torque converter T/C associated with an output shaft E of an automotive engine (not shown). An input shaft I transmits rotational torque generated by the torque converter T/C to an output shaft O for transmitting driving torque to a final drive device (not shown) via a first planetary gear assembly $G_1$ and a second planetary gear assembly $G_2$. The power transmission mechanism further includes a high and reverse clutch H&R/C, a forward clutch F/C, a band brake B, a low and reverse brake L&R/B and a one-way clutch OWC. The torque converter T/C incorporates a lock-up clutch L/C. As is well known, the lock-up clutch L/C is engaged when pressure is applied to an application chamber T/A and is released when pressure is applied to a release chamber T/R.

The first planetary gear assembly $G_1$ comprises a sun gear $S_1$, an internal gear $R_1$ and pinions $P_1$ (only one is shown but practically provided in several) which mesh with both the sun gear $S_1$ and the internal gear $R_1$, simultaneously. The pinions $P_1$ supported by means of a pinion carrier $PC_1$. The second planetary gear assembly $G_2$ comprises a sun gear $S_2$, an internal gear $R_2$ and pinions $P_2$ which mesh with both the sun gear $S_2$ and the internal gear $R_2$, simultaneously. The pinions $P_2$ are supported by means of a pinion carrier $PC_2$. The components set forth above are arranged and associated as shown in FIG. 1.

The high and reverse clutch H&R/C, the forward clutch F/C, the band brake B, low and reverse brake L&R/B and one-way clutch OWC are cooperatively operated to control rotation of respective gears in the first and second planetary gear assemblies and whereby to control rotation speed of the output shaft O versus the rotation speed of the input shaft I to establish gear selection between three forward gear positions and reverse gear position.

FIG. 2 schematically shows the first embodiment of the automatic transmission control system of the present invention. The shown hydraulic circuit includes a shift valve 10 which is designed for shifting between a first gear position and a second gear position and is therefore hereafter referred to as "1-2 shift valve". The 1-2 shift valve 10 generally comprises a valve spool 12 thrustingly disposed in a grooved valve bore 12a. The valve spool 12 can be shifted between a position illustrated in the upper half which position will be hereafter referred to as the "first position" and a position illustrated in the lower, half which position will be hereafter referred to as the "second position". The valve spool 12 is formed with a groove 12b circumferentially extending on the outer periphery. The valve bore 12a is formed with circumferentially extending ports 12c, 12d, 12e, 12f and 12g with given intervals. The width of groove 12b of the valve spool 12 is selected so that the port 12e may be communicated with the port 12d at the second position and with the port 12f at the first position. The port 12d is communicated with a manual valve 24 and the forward clutch F/C via a path 16. The port 12e communicates with with an application chamber S/A of a band servo device BS which also has a release chamber S/R, via a path 18. The port 12f serves as a drain port and thus connected to a drain path 17. The port 12c is communicated with a pilot pressure valve 48 via path 50 with an orifice 52 and a path 20 to introduce a pilot pressure to a pilot chamber 22 which is defined opposing one end of the valve spool 12. A set spring 14 is disposed within the valve bore 12a and exerts a resilient force to the other end of the valve spool 12. The resilient force is set at a magnitude to switch the valve position of the valve spool 12 according to variation of pressure in the pilot chamber 22 across the set pressure PB. Therefore, the valve spool 12 is placed at one of the first and second positions depending upon magnitude of the pilot pressure versus the set pressure PB.

At the second position, the groove 12b of the valve spool communicates with the ports 12d and 12e for establishing fluid communication between the forward clutch F/C and manual valve 24 and the release chamber S/R of the band servo device BS. The path 18 further connects the port 12e to a port 28f of another shift valve 26. The shift valve 26 is designed for controlling shifting between second gear position and third gear position. Therefore, the shift valve 26 will be hereafter referred to as a "2-3 shift valve".

Similarly to the foregoing 1-2 shift valve 10, the 2-3 shift valve 26 comprises a valve spool 28 thrustingly disposed within a grooved valve bore 28a. The valve spool 28 is formed with a circumferentially extending groove 28b. The valve bore 28a is formed with ports 28c, 28d, 28e, 28f and 28g. The port 28c is communicated with the pilot pressure valve 48 via a path 50 and a path 75 with an orifice 78. The port 28d is communicated with a drain path 29. The port 28e is communicated with the high and reverse clutch H&R/C and the band servo device BS via a path 32 with an orifice 31.

Through the port 28c, a pilot pressure from the pilot pressure valve 48 is introduced into a pilot chamber 34 defined opposing one end of the valve spool 28. A set spring 30 is disposed within the valve bore 28a and exerts a resilient force at a set force to the other end of the valve spool 28. Therefore, the valve spool 28 is placed at one of the first and second positions depending upon the magnitude of pilot pressure versus the set pressure PA. As controlled by the pilot pressure in the pilot chamber 34, the valve spool 28 is placed at a position illustrated in the upper half, which position will be hereafter referred to as "first position", and a position illustrated in the lower half, which position will be hereafter referred to as "second position".

At the second position, the groove 28b of the valve spool connects the ports 28d and 28e for establishing fluid communication between the path 31 and the drain path 29. On the other hand, at the first position, the groove 28b of the valve spool 28 establishes communication between the ports 28e and 28f to connect the path 18 to the path 32.

The path 75 is also communicated with a port 71c of a lock-up control valve 70. The lock-up control valve 70 includes a valve spool 71 defining circumferentially extending grooves $71b_1$ and $71b_2$. The valve spool 71 is thrustingly disposed within a grooved valve bore 71a. Circumferentially extending ports 71c, 71d, 71e, 71f, 71g, 71h and 71i are formed on the inner periphery of the valve bore 71a. The port 71d is connected to an oil cooler 85 via a path. The ports 71e and 71g are both communicated with a lock-up clutch L/C which has an application chamber T/A and a release chamber T/R, via paths 83 and 87. The port 71f is connected to a pressure regulator valve 89 via a path 89. The port 71h communicates with a drain path 73. The pilot pressure introduced through the port 71c into a pilot chamber 76 cooperates with a set spring 72 disposed in opposition to the end of the valve spool 71 remote from the pilot chamber 76 to place the valve spool at the position depending upon the magnitude of pilot pressure versus the set pressure PA. By the pilot pressure in the pilot chamber 76, the valve spool 71 is shifted between a position illustrated in the upper half, which position will be referred to as the "first position" and a position illustrated in the lower half, which position will be referred to as "second position". At the first position, the groove $71b_1$ of the valve spool 71 establishes fluid communication between the pressure regulator valve 89 and the application chamber T/A of the lock-up clutch L/C. Also, at the first position, the groove $71b$ establishes communication between the release chamber T/R of the lock-up clutch L/C with the drain path 73. On the other hand, at the second position, the groove $71b_1$ establishes fluid communication between the oil cooler 85 and the application chamber T/A of the lock-up clutch L/C, and the groove $71b_2$ establishes fluid communication between the release chamber T/R of the lock-up clutch L/C and the pressure regulator valve 89.

To the paths 20 and 75, constant pilot pressure is supplied from the pilot pressure valve 48 via the pressure regulating orifices 52 and 78. The path 20 is formed with a port 54 which is open and closed by means of a solenoid valve 56. By opening the port 54 by deenergizing the solenoid valve 56, the path 20 becomes open and thus the pilot pressure to be introduced into the pilot chamber 22 of the 1-2 shift valve 10 becomes LOW level. On the other hand, when the port 54 is closed by energization of the solenoid valve 56, the path 20 becomes closed to apply HIGH level pilot pressure to the pilot chamber 22 of the 1-2 shift valve 10. Similarly, a port 79 is formed in the path 75 which is open and closed by means of a solenoid valve 80. When the port 79 opens by denergization of the solenoid valve 80, the pilot pressure introduced into the pilot chambers 34 and 76 via the path 75 becomes LOW level. On the other hand, by closing the port 79 by energization of the solenoid valve 80, the pilot pressure in the pilot chambers 34 and 76 becomes HIGH level.

The solenoid valves 56 and 80 are electrically connected to a control unit 58 which comprises a microprocessor. The control unit 58 is also connected to a vehicle speed sensor 60 and a throttle angle sensor 62 to receive therefrom a vehicle speed indicative signal and a throttle angle indicative signal. Based on the vehicle speed indicative signal and the throttle angle indicative signal, the control unit 58 produces a first and a second control signals for controlling the solenoid valves 56 and 80, respectively.

The first control signal produced by the control unit 58 is ON/OFF signal for holding the solenoid valve 56 at energized position, at which the port 54 is closed, and at a deenergized position, at which the port 54 is open. On the other hand, the second control signal to be applied to the solenoid valve 80 is in a form of a pulse train having variable HIGH level pulse width for defining duty ratio of energization period versus deenergization period. Therefore, the solenoid valve 80 is operated to repeatedly and periodically alternate the position between an energized position and a deenergized position to adjust the pilot pressure to be introduced into the pilot chambers 34 and 76.

In the shown embodiment, the control unit 58 is designed to output three mutually different duty cycles of second control signals depending upon the vehicle speed indicative signal and the throttle angle indicative signal. Corresponding to the three different duty cycles of the second control signal, the pilot pressure in the path 75 varies between $P_1$, $P_2$ and $P_3$ ($P_3 < P_2 < P_1$).

When the pilot pressure in the path 75 is lower than or equal to the set pressure $P_B$ determined by the set spring 30, the valve spool 28 of the 2-3 shift valve 26 is placed at the second position to establish communication of the release chamber S/R of the band servo device BS and the high and reverse clutch H&R/C to the drain path 29. When the pilot pressure in the pilot chamber 34 becomes higher than the set pressure PB, the valve spool 28 is shifted to the first position to establish fluid communication between the path 18 and the high and reverse clutch H&R/C and the release chamber S/R of the band servo device BS. On the other hand, as long as the pilot pressure in the pilot chamber 76 is lower than or equal to the set pressure $P_A$ determined by the set spring 72, the valve spool 71 is maintained at the second position to communicate between the application chamber T/A of the lock-up clutch L/C and the oil cooler 85, and between the release chamber T/R of the lock-up clutch L/C and the pressure regulator valve 89. When the pilot pressure becomes higher than the set pressure $P_A$, the spool valve 71 is shifted to the first position to establish fluid communication between the application chamber T/A of the lock-up clutch L/C and the pressure regulator valve 89, and between the release chamber T/R of the lock-up clutch L/C and the drain path 73.

Figure 3:
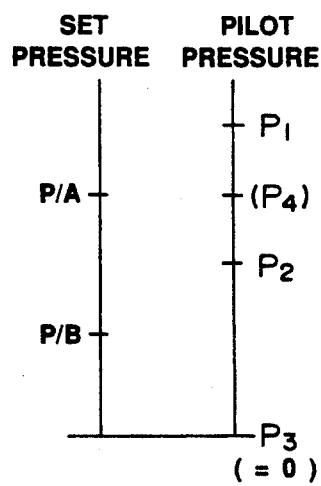
FIG. 3 is a chart showing the relationship between set pressure and control pressure to to get shift position and lock-up and so forth.

Here, the set pressure $P_A$ determined by the set spring 72 is set at a greater pressure than the set pressure $P_B$ determined by the set spring 30. ($P_3 < P_B < P_2 < P_A < P_1$). The relationship of the pressure is shown in FIG. 3.

In operation, when the solenoid valve 56 is energized by the first control signal, the pilot pressure at the pilot chamber 22 becomes HIGH level. This causes shifting of the valve spool 12 of the 1-2 shift valve 10 from the second position to the first position to establish fluid communication between the path 18 and the drain path 17. The band servo device BS and the high and reverse clutch H&R/C are disengaged irrespective of the position of the 2-3 shift valve 26. On the other hand, the forward clutch F/C is kept engaging. This causes the transmission at the first gear position. On the other hand, when the solenoid valve 56 is deenergized to open the port 54 in response to OFF of the first control signal, the pilot pressure in the pilot chamber 22 is lowered to LOW level to cause shifting the valve spool 12 to the second position to establish fluid communication between the manual valve 24 and the band servo device BS.

When the pilot pressure applied to the pilot chamber 34 of the 2-3 shift valve 26 is $P_3$ to maintain the valve spool 28 at the second position for blocking the port 28f while the 1-2 shift valve 10 is shifted at the second position, the line pressure is applied to the application chamber S/A of the band servo device BS as well as the forward clutch F/C. By application of the line pressure to the application chamber S/A, the band servo device BS engages the band brake B. This causes shifting of the automatic transmission at the second gear position.

By increasing the pilot pressure to $P_2$ or $P_1$, the pilot pressure at the pilot chamber 34 exceeds the set pressure $P_B$ determined by the set spring 30 to cause shifting of the valve spool 28 from the second position to the first position. Then, line pressure is applied to the high and reverse clutch H&R/C and the release chamber S/R of the band servo device BS to cause shifting of the transmission gear position to the third gear position.

When the pilot pressure is $P_2$ or $P_3$, the valve spool 71 is placed at the second position to maintain fluid communication between the application chamber T/A of the lock-up clutch L/C and the oil cooler 85 and between the release chamber T/R of the lock-up clutch L/C and the pressure regulator valve 89. Therefore, the lock-up clutch L/C is maintained at the released condition. On the other hand, when the pilot pressure in the pilot chamber 76 is increased to the pressure Pl, the valve spool 71 is shifted to the first position. Then, fluid communication is established between the application chamber T/A of the lock-up clutch L/C and the pressure regulator valve 84 and between the release chamber T/R of the lock-up clutch L/C and the drain path 73. This causes engagement of the lock-up clutch.

Therefore, in the shown embodiment, lock-up clutch position and the 2-3 shift valve are controlled by means of a single solenoid valve 80. Accordingly, when the transmission gear position is shifted from the second gear position to the third gear position, the lock-up clutch L/C is disengaged by the pilot pressure $P_3$ at the second gear position. Thereafter, the pilot pressure is set at $P_2$ to cause switching of valve position of the 2-3 shift valve 26 with maintaining the lock-up clutch L/C at the disengaged condition to set at the third gear position. With a certain delay time, the pilot pressure is set at $P_1$ to cause engagement of the lock-up clutch to establish lock-up condition at the third gear position. Therefore, reduction of shift shock can be accomplished by establishing lock-up after shifting up of transmission gear.

It is also possible to provide a fourth pressure between the first and second pressures, which fourth pressure may be substantially equal to the set pressure determined by the set spring 72 to place the valve spool 71 at the position between the first and second positions. In such case, the line pressure to be applied to the application chamber T/A becomes insufficient to fully establish lock-up and will cause certain slip. This condition may be referred to as "slip lock-up".

Figure 4:
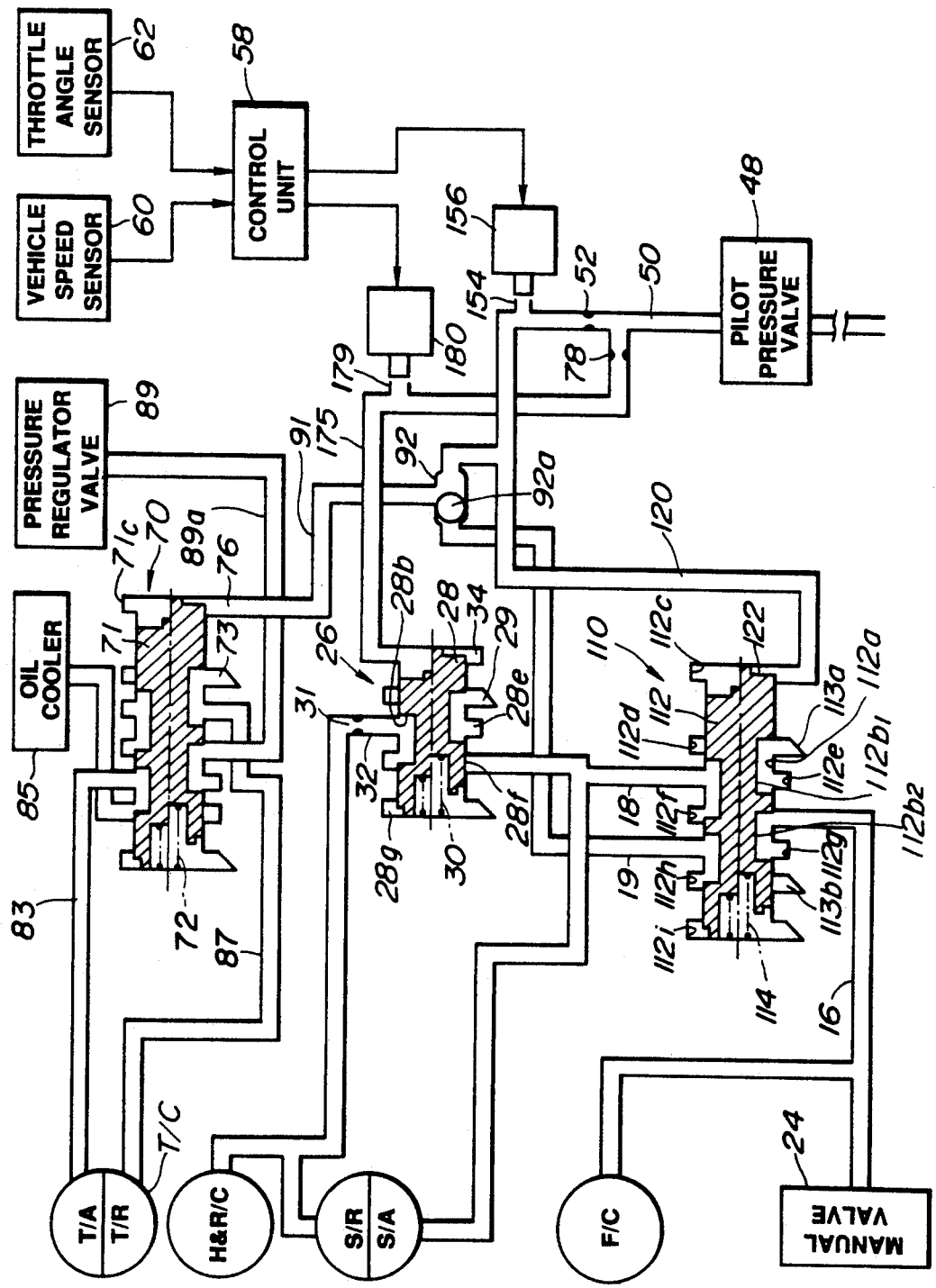
FIG. 4 a schematic circuit diagram of a modification of the first embodiment of the automatic transmission control system of FIG. 2.

FIG. 4 shows a modification of the foregoing first embodiment of the automatic transmission control system, according to the invention. In the shown modification, the components common to the foregoing first embodiment will be represented by the same reference numerals to that used in the discussion of the first embodiment.

As will be seen from FIG. 4, the shown embodiment a solenoid 156 for opening and closing a port 154 in a path 120 is controlled by a duty cycle of a first control signal. Different from the first embodiment of FIG. 2, the relationship between the duty cycle and the pilot pressure is opposite. Namely, in the embodiment of FIG. 4, when only duty cycle for the solenoid valve 156 is increased, the pilot pressure is decreased. Therefore, when the solenoid is deenergized, the pilot pressure becomes maximum. On the other hand, a solenoid valve 180 is controlled by ON/OFF switching second control signal for opening and closing a port 179 defined in a path 175. Similarly to the foregoing embodiment, the pilot pressure valve 48 is connected to the 1-2 shift valve 110 which comprises a valve spool 112 disposed in a valve bore 112a. The valve spool 112 is formed with circumferentially extending grooves 112b$_1$ and 112b$_2$. Ports 112c, 112d, 112e, 112f, 112g, 112h and 112i are formed on the inner periphery of the valve bore 112b. The port 112c is connected to the pilot chamber 122 and connected to the path 120. The port 112d is connected to a drain path 113a. The port 112e is connected to the port 28f and the application chamber S/A of the band servo device BS. The port 112f is connected to the manual valve 24 and the forward clutch F/C. The port 112g is connected to the port 71c of the pilot chamber 76 via a shuttle valve 92 which has a valve member 92a. The port 112h is connected to a drain path 113b. The valve spool 112 is shifted between a position illustrated in the upper half, which position will be hereafter referred to as "first position" and a position illustrated in the lower half, which position will be referred to as "second position", depending upon the magnitude of pilot pressure versus the set pressure $P_B$ determined by a set spring 114.

Figure 5:
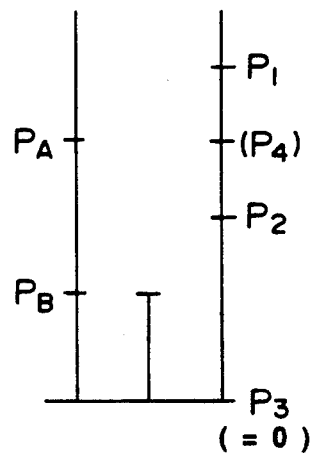
FIG. 5 is a chart showing the relationship between set pressure and control pressure to to get shift position and lock-up clutch position and so forth.

The pilot pressure generated by the solenoid valve 156 varies between the greatest pressure $P_1$, the intermediate pressure $P_2$ and the smallest pressure $P_3$. The set pressure $P_B$ determined by the set spring 114 is greater than the pressure $P_3$ and smaller than $P_2$. Relationship between the pilot pressure and the transmission gear positions is shown in FIG. 5. As long as the pilot pressure at the pilot chamber 122 is maintained at $P_3$, the valve spool 112 is placed at the second position to connect the application chamber S/A of the band servo device BS to the drain path 113a and the manual valve 24 to the shuttle valve 92. On the other hand, when the pilot pressure in the pilot chamber 122 becomes $P_2$ or $P_1$, the valve spool 112 is shifted to the first position to establish fluid communication between the shuttle valve 92 and the drain path 113b and between the manual valve 24 and the port 28f of the 2-3 shift valve 26 and the application chamber S/A of the band servo device BS.

In the operation, when the pilot pressure in the path 120 is adjusted at $P_3$ by the solenoid valve 156, the valve spool 112 of the 1-2 shift valve 110 is shifted to the second position. At this position, the line pressure is applied to the forward clutch F/C to engage the clutch. At this position, since the line pressure is not supplied to the application chamber S/A of the 2-3 shift valve 26, the band servo device BS does not cause engagement of the band brake B and the high and reverse clutch H&R/C does not engage, therefore, the automatic transmission is held at the first gear position.

At this position, since the line pressure is supplied to the pilot chamber 76 of the lock-up control valve 70, the valve spool 71 is shifted to the first position to connect the application chamber T/A of the lock-up clutch L/C to the oil cooler 84 and the release chamber T/R to the pressure regulator value 89 to cause disengagement of the lock-up clutch. Therefore, lock-up is released.

When the pilot pressure is increased to $P_2$, the valve spool 112 is shifted to the second position to connect the manual valve 24 to the 2-3 shift valve 26 and to the application chamber S/A of the band servo device BS. When the second control signal for the solenoid valve 180 is held OFF to place the valve spool 28 of the 2-3 shift valve 26 at the second position, at which the port 28f is blocked and the release chamber S/R and the high and reverse clutch H&R/C are drained, the line pressure is applied to the application chamber S/A of the band servo device BS to cause engagement of the band brake B. Therefore, the automatic transmission is shifted to the second gear position.

At the same time, since the shuttle valve 92 is connected to the drain path 113b at the first position of the valve spool 112, the pressure exerted to the shuttle valve 92 via the path 19 becomes smaller than the pilot pressure $P_2$, therefore, the pilot pressure is introduced into the pilot chamber 76 of the lock-up control valve 70. Since the pilot pressure $P_2$ is smaller than the set pressure $P_A$ as set forth above, the valve spool 71 is placed at the second position for establishing fluid communication between the application chamber T/A of the lock-up clutch L/C and the pressure regulator valve 89 and between the release chamber T/R and the drain path 73 to cause engagement of the lock-up clutch L/C. Therefore, at this position, lock-up at the second gear position is established.

At this condition, when the second control signal for the solenoid valve 180 turns ON to energize the latter, the valve spool 28 of the 2-3 shift valve 26 is shifted to the first position to supply the line pressure to the high and reverse clutch H&R/C and the release chamber S/R of the band servo device BS. Then, high and reverse clutch H&R/C is engaged and band brake B is released to cause shifting of the transmission to the third gear position. Therefore, at this condition, lock-up at the third gear position is established.

When the pilot pressure is further increased to $P_1$, the valve spool 71 is shifted to the first position to disengage the lock-up clutch L/C At the same time, the 1-2 shift valve is positioned at the first position to enable shifting between the second and third gear positions. Therefore, lock-up is released at the pilot pressure $P_1$. When the transmission is shifted up from the second gear position to the third gear position, the pilot pressure is set at $P_1$ and the solenoid valve 180 is held OFF. By this, the lock-up is released at the second gear position. Subsequently, the solenoid valve 180 is turned ON to shift the transmission gear to the third gear position with maintaining the lock-up released state.

Thereafter, the pilot pressure is set at $P_2$ for establishing lock-up at the third gear position.

When the first control signal for the solenoid valve 156 becomes zero due to breakage of the circuit, the pilot pressure to be applied to the pilot chamber 122 becomes $P_1$ to place the valve spool 112 at the first position to set the transmission at the second gear position. At the same time, by the pilot pressure $P_1$, the lock-up clutch L/C is disengaged. By this, even when the control for the solenoid valve 156 fails, safety can be assured and the vehicle can be driven safely.

Figure 6:
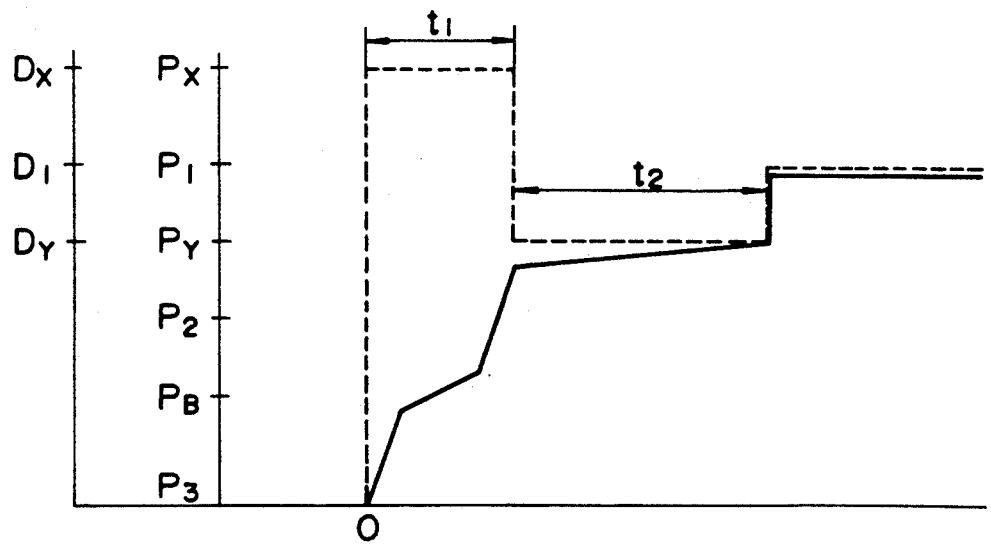
FIG. 6 is a chart showing variation of duty cycle in the control signal to be applied to the duty controlled solenoid valve in the first embodiment of the automatic transmission control system of FIG. 2.

In the practical control of the pilot pressure, it requires a certain period of time for increasing the fluid pressure to the commanded pressure. This lag time is reflected as lag in shifting of the automatic transmission gear positions. This degrades the response characteristics in transmission control. It is assumed that the final target pressure is $P_1$. Improvement can the accomplished by that the control unit 58 initially produces higher duty control signal which has a first duty cycle Dx which commands the pressure $P_x$ higher than the pressure $P_1$. The duty cycle of the control signal is maintained for a first given period $t_1$. After expiration of the $t_1$ period, the duty cycle is lowered to Dy which substantially corresponds to the set pressure $P_A$ which is lower than the final target pressure $P_1$. Variation of the set pressure versus variation set out here is opposite to that discussed concerning the former embodiment of FIG. 2. The duty cycle of the control signal is maintained at Dy for a second period $t_2$. At the end of the $t_2$ period, the duty cycle is set at $D_1$ which corresponds to the pressure $P_1$ as shown in FIG. 6. By adjusting the duty cycle of the control signal in such a manner, actual pilot pressure increases as illustrated by the solid line in FIG. 6. Therefore, improved response characteristics can be obtained.

Figure 7:
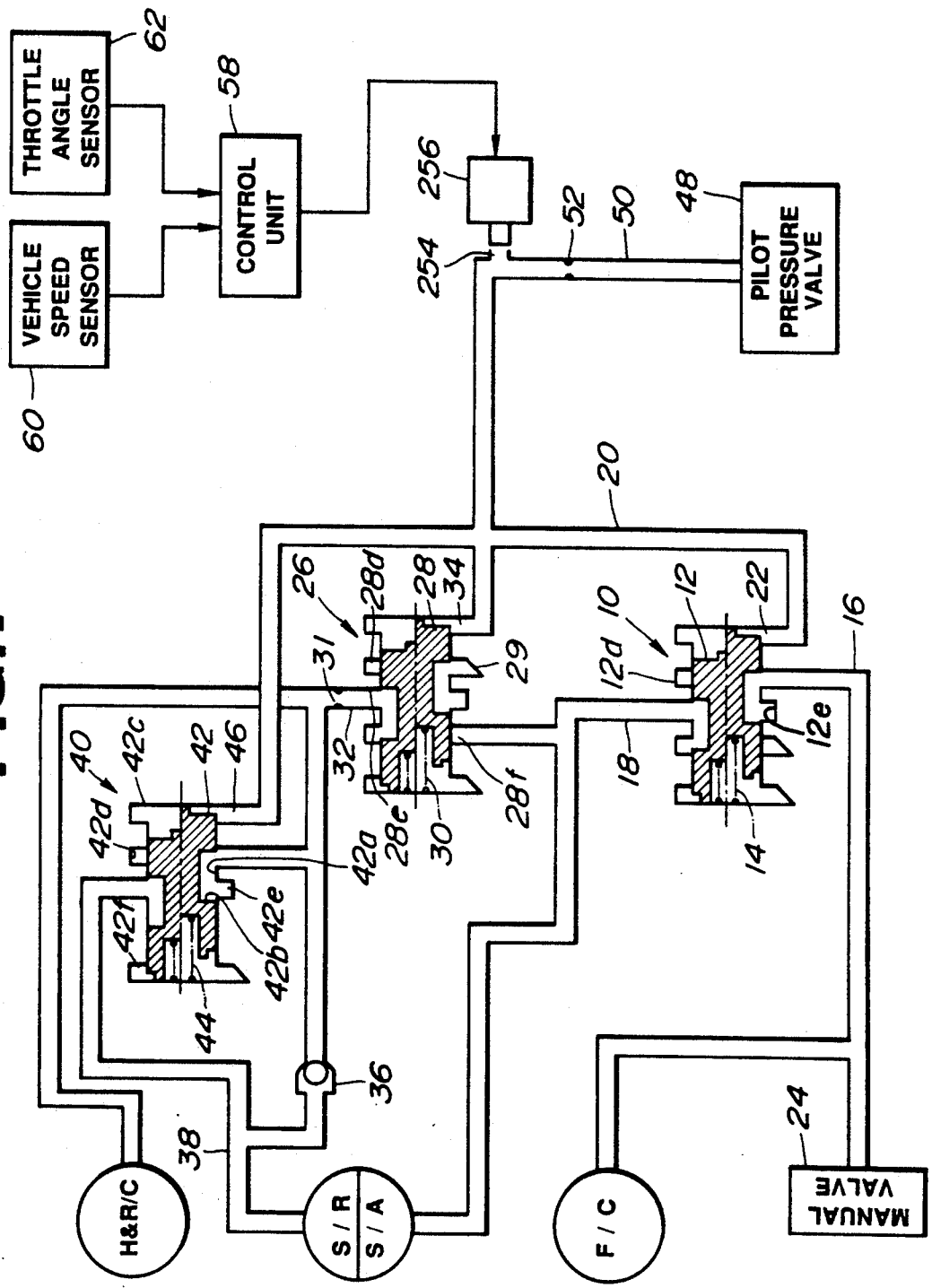
FIG. 7 is a schematic circuit diagram of the second embodiment of the automatic transmission control system according to the present invention.

FIG. 7 shows the second embodiment of the automatic transmission control system according to the present invention. In the shown embodiment, the 1-2 shift valve 10, the 2-3 shift valve 26 and a 3-2 timing valve 40 are controlled by means of a single solenoid valve 256.

The 3-2 timing valve 40 comprises a valve spool 42 disposed within a valve bore 42a. The valve spool 42 is formed with a circumferentially extending groove 42b. The valve bore 42a is formed with circumferentially extending grooves 42c, 42d, 42e and 42f. The port 42c is connected to the pilot pressure valve 48. The port 42d is connected to the port 28e of the 2-3 shift valve 26 and to the release chamber S/R of the band servo device BS via an one-way check valve 36. The port 42e is connected to the release chamber S/R via the path 38.

Figure 8:
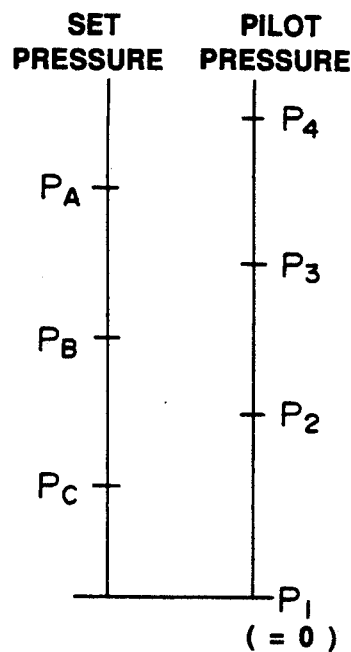
FIG. 8 a chart showing relationship between set pressure and control pressure to to get shift position and 3-2 timing valve position shifting between first, second and third gear positions.

The solenoid valve 256 is controlled by the control signal defining a duty cycle from the control unit 58. The duty cycle of the control signal varies to four values corresponding to the pressure $P_1$, $P_2$, $P_3$ and $P_4$ ($P_4 > P_3 > P_2 > P_1$). The 1-2 shift valve 10 has a valve spool shifted when the pressure varies across the set pressure $P_A$ by the set spring 14. The 2-3 shift valve 26 has a valve spool shifted when the pressure varies across the set pressure $P_B$ by the set spring 30. The 3—2 timing valve 40 has a valve spool shifted when pressure varies across the set pressure $P_C$ by a set spring 44. These set pressure $P_A$, $P_B$ and $P_C$ are related to the pilot pressure $P_1$, $P_2$, $P_3$ and $P_4$ as $P_4 > P_A > P_3 > P_B > P_2 > P_C > P_1$, as shown in FIG. 8.

In the operation, when pilot pressure $P_4$ is generated by the solenoid valve 256, both of the valve spools 12 and 28 are shifted to the first positions. By shifting the valve spool 12 at the first position, the port 12d is blocked. Therefore, the line pressure is applied only to the forward clutch F/C engaged. Therefore, the automatic transmission is shifted to the first gear position. When the pilot pressure is decreased to $P_1$ or $P_2$, the valve spool 12 of the 1-2 shift valve 10 is shifted to the second position to establish fluid communication between the manual valve 24 and the application chamber S/A of the band servo device BS and between the manual valve 24 and the port 28f of the 2-3 shift valve 26. At this time, since the valve spool 28 of the 2-3 shift valve 26 is maintained at the second position to block line pressure, the band brake B and the forward clutch F/C are engaged to shift the automatic transmission to the second gear position.

When the pilot pressure $P_1$ is applied to the pilot chamber 46 of the 3-2 timing valve 40, the valve spool 42 is maintained at the second position to establish communication between the port 42d and the port 42e with the release chamber S/R of the band servo device BS. When the pilot pressure increases to $P_2$, the pressure in the pilot chamber 46 causes shifting of the valve spool 42 to the first position to block the port 42d. At this time, however, since the valve spool 28 of the 2-3 shift valve 26 maintains blocking of the line pressure, the transmission is maintained at the second gear position.

When the pilot pressure is increased to $P_3$, the pressure in the pilot chamber 34 causes shifting of the valve spool 28 to the first position. As a result, the line pressure is supplied to the release chamber S/R of the band servo device BS and the high and reverse clutch H&R/C. This causes shifting of the automatic transmission to the third gear position. At this condition, when the pilot pressure is decreased from $P_3$ to $P_2$, the valve spool 28 of the 2-3 shift valve 26 is shifted to the second position to block line pressure from the port 42e of the 1-2 shift valve 10 and drain the line pressure applied to the high and release clutch H&R/C via the port 28d. Therefore, the high and reverse clutch H&R/C is disengaged. At this time, the valve spool 42 of the 3-2 timing valve 40 is maintained at the first position to disconnect the path 38 from the path 32, and line pressure applied to the release chamber S/R of the band servo device BS is maintained. By holding the line pressure in the release chamber S/R, the shift position of the automatic transmission becomes neutral. Subsequently, after an optimum neutral interval, by decreasing the pilot pressure to $P_1$, the valve spool 42 of the 3-2 shift valve 40 is shifted to the second position to establish fluid communication between the port 42d and the port 28d to drain the line pressure in the release chamber S/R of the band servo device BS. As a result, the automatic transmission is shifted to the second gear position.

The control unit 58 adjusts timing of switching pilot pressure from $P_3$ to $P_2$ and from $P_2$ to $P_1$ upon shifting from the third gear position to the second gear position, so as to hod the pilot pressure at $P_2$ for a given period of time. By holding the pilot pressure at $P_2$, the transmission is maintained at neutral to cause increasing of the engine speed. Increasing of the engine speed while the transmission is shifted at neutral, held to reduce difference of the speed between the engine and transmission for reducing shift shock.

Figure 10:
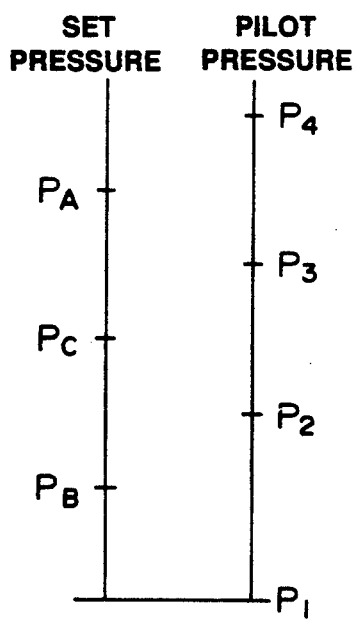
FIG. 10 is a chart showing the relationship between set pressure and control pressure to to get shift position and 3-2 timing valve position shifting between first, second and third gear positions.

FIG. 9 shows a modification of the foregoing second embodiment of the automatic transmission control system according to the invention. In this modification, path 16A is added to directly connect the manual valve 24 to the port 28f of the 2-3 shift valve 26. In this case, transmission gear shifting down operation is performed in the following manner. At first, the set pressure $P_A$, $P_B$ and $P_C$ are set to establish the relationship with the pilot pressure $P_1$, $P_2$, $P_3$ and $P_4$ as $P_4 > P_A > P_3 > P_C > P_2 > P_B > P_1$, as shown in FIG. 10. By this arrangement, substantially the same shock reduction can be obtained from this modification.

It should be appreciated that the shown second embodiment employs the timing valve which assist for reducing shift shock in down-shifting. A similar idea would be applicable for reduction of shift shock in up-shifting. It should be noted that in the shown embodiment of FIG. 7, the transmission gear position is set at the second gear position when pressure drops in the line 20 due to failure of the solenoid 56, whereas, the transmission gear position is set at the third gear position in the embodiment of FIG. 9.

Figure 12:
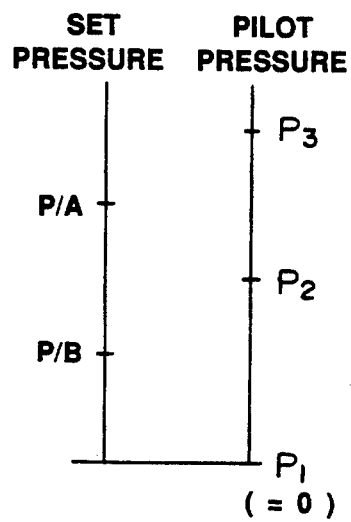
FIG. 12 is a chart showing relationship between set pressure and control pressure to get shift position and 3-2 timing valve position in shifting between first and second gear positions in the second embodiment of the automatic transmission control system of FIG. 11.

FIG. 11 shows another modification of the second embodiment of the automatic transmission control system according to the invention. In this modification, 3-2 timing valve 40 is provided in cooperation with the 1-2 shift valve 10. These 3-2 timing valve 40 and 1-2 shift valve 10 are controlled by the pilot pressure generated by the solenoid valve 56 which produces three different pressure $P_1$, $P_2$ and $P_3$. The set pressure. $P_A$ and $P_B$ of the 1-2 shift valve 10 and the 2-3 timing valve 40 are set for establishing $P_1 < P_B < P_2 < P_A < P_3$, as shown in FIG. 12. On the other hand, the 2-3 shift valve 26 is controlled by the pilot pressure generated by ON/OFF of the solenoid valve 76.

By the shown construction, substantially the equivalent shift shock reduction can be achieved.

Figure 13:
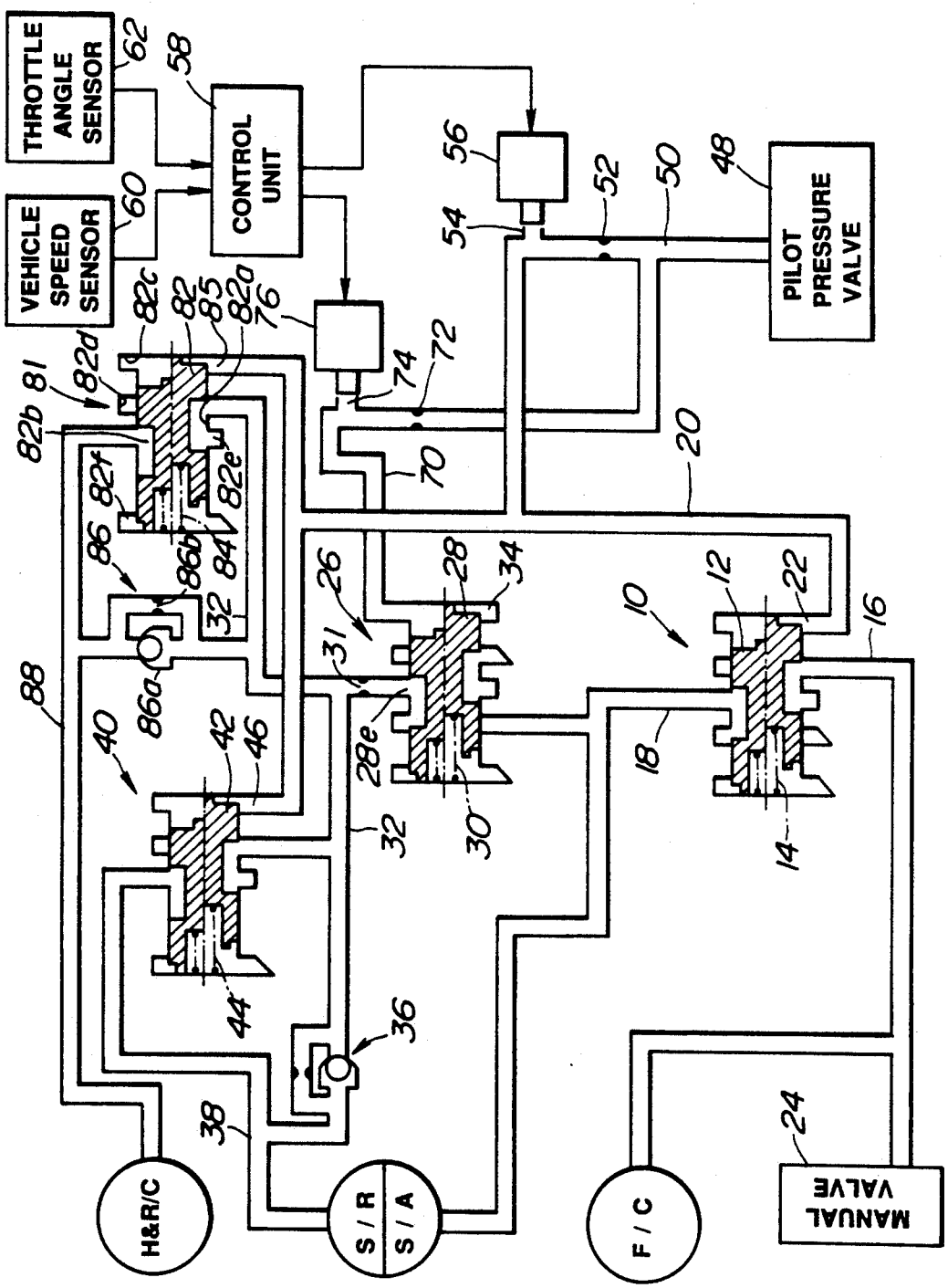
FIG. 13 is a schematic circuit diagram of a further modification of the second embodiment of the automatic transmission control system of FIG. 7.

FIG. 13 shows a further modification of the second embodiment of the automatic transmission control system according to the invention. In this modification, a 2-3 timing valve 80 is added to the construction shown in FIG. 11 for reducing shift shock in up-shifting from the second gear position to the third gear position. Since the construction and operation of the components of the shown embodiment is identical or, in the alternative, similar to that discussed above, no further detailed discussion will be made expect for the hydraulic connection and operation of the 2-3 timing valve 81.

Figure 14:
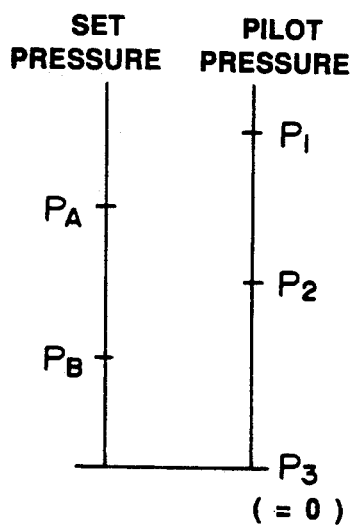
FIG. 14 is a chart showing the relationship between set pressure and control pressure to get shift position, 3-2 timing valve position and 2-3 timing valve position in shifting between second and second gear positions in the third embodiment of the automatic transmission control system of FIG. 13.

Similarly to the 3-2 timing valve 40, the valve position of the 2-3 timing valve 81 is controlled by the pilot pressure generated by the solenoid valve 56. As seen from FIG. 14, the 2-3 timing valve 80 is provided a set pressure equal to the set pressure $P_B$ of the 3-2 timing valve 40, as shown in FIG. 14. The 2-3 timing valve 81 comprises a valve spool 82 thrustingly disposed within a valve bore 82a. The valve spool 82 is formed with a groove 82b. A plurality of circumferentially extending ports 82c, 82d, 82e and 82f are formed on the inner periphery of the valve bore 82a. The port 82c is connected to the pilot pressure valve 48 to receive therefrom the pilot pressure. The port 82d is connected to the port 28e of the 2-3 shift valve 26 via a path 32. The port 82e is connected to the high and reverse clutch H&R/C via a path 88. The path 32 is further communicated with the path 88 by a by-pass path 86 including a one-way check valve 86a and a flow restricting orifice 86b.

On the other hand, the 2-3 timing valve 81 operates as follows. According to pressure in the path 20 which is varied between $P_2$ and $P_3$, the valve position of the 2-3 timing valve 81 is switched. When the pressure in the path 20 is set at the pressure $P_2$, the valve position of the 2-3 timing valve 81 becomes as illustrated in the upper half. Therefore, the fluid communication between the paths 32 and 88 is blocked. On the other hand, when the pressure in the path 20 is set at the pressure $P_3$, fluid communication between the paths 32 and 88 is established. Utilizing this, timing of the 2-3 shift valve 26 can be adjusted. For instance, in the transition where the accelerator is returned to a throttle valve fully closed position from the accelerating state, timing of the 2-3 shift valve 26 can be adjusted based on the foregoing function. In this case, by releasing the accelerator, 2-3 shifting command is supplied to the solenoid valve 76 to turn the latter from ON to OFF. By this, the 2-3 shift valve 26 is shifted from the second gear position to the third gear position. At this time, by holding the pressure in the path 20 at $P_2$, the 2-3 timing valve 81 is maintained at the position illustrated in the upper half. Accordingly, though the pressure supplied to the high and reverse clutch H&R/C, increasing of the pressure in the high and reverse clutch H&R/C is moderate because fluid is supplied only through the one-way orifice 86. On the other hand, pressure is supplied rapidly to the release chamber S/R of the band servo device BS via the one-way orifice 36. After holding this condition for a given period, the pressure in the path 20 is switched from $P_2$ to $P_3$. According to this, 2-3 timing valve is 81 is shifted from the position illustrated in the upper half to the position illustrated in the lower half. By this, fluid communication between the paths 88 and 32 is established. Therefore, the pressure in the high and reverse clutch H&R/C is rapidly increased. As will be appreciated herefrom, by the foregoing process, the pressure of the release chamber S/R of the band servo device BS can be increased in advance of increasing of the pressure in the high and reverse clutch H&R/C for a given period of time. By this, the automatic power transmission is temporarily placed at the neutral range. During this period, the engine speed is lowered and subsequently the transmission gear position is shifted to the third gear position. Therefore, neutral range condition is provided during shifting operation between the second gear position to the third gear position. This effectively reduces difference of speeds between the engine and the transmission to reduce the shifting shock.

The period of time to hold the automatic transmission at the neutral range is determined by means of an electronic control system 58 according to preselected control parameters, such as vehicle speed, throttle valve open angle and so forth.

It should be appreciated, in the shifting up operation from the second gear position to the third gear position which is triggered other than shifting operation after kick-down, the pressure in the path 20 is held at $P_3$ so as to supply the pressure to the high and reverse clutch H&R/C without influence of the one-way orifice 86.

It should be noted that, in the shown embodiment, when the electronic control system 58 or the solenoid valve 56 fails to drop the pressure in the path 20 to zero, the transmission gear position is set at second gear position to assure safety of driving. On the other hand, switching the solenoid valve 76 from ON to OFF and switching of pressure from $P_2$ to $P_3$ can be controlled completely independently of each other. Accordingly, it is possible to set the shifting timing of the 2-3 shift valve 26 and the 3-2 timing valve 40 so that the 3-2 timing valve is shifted in advance of shifting of the 2-3 shift valve. Furthermore, it is possible to set the pressure in the path 20 for a substantially short period at the initial stage of shifting operation from the first gear position to the second gear position, and subsequently switch the pressure to $P_3$, delay can be provided for lowering of the pressure in the release chamber S/R of the band servo device BS. This also effective for reducing the shift shock.

When the pilot pressure in a pilot chamber 85 is $P_2$, the valve spool 82 is shifted at a position shown in the upper half, which position will be hereafter referred to as a "first position". At this valve position, the port 82d blocks communication with the port 82e for disconnecting the port 82d from the high and reverse clutch H&R/C via the 2-3 timing valve 81. As long as the control signal to the solenoid valve 76 is HIGH to energize the latter, the line pressure is supplied to the high and reverse clutch H&R/C only via the orifice 86b in the by-pass path 86. Therefore, increasing of the line pressure in the high and reverse clutch H&R/C is rather slow. At the same time, since the line pressure is supplied to the release chamber S/R via the one-way check valve 36 to disengage the band brake B. This causes the automatic transmission shift position to temporarily become neutral. By subsequently decreasing the pilot pressure to $P_3$ after an optimum neutral interval, the valve spool 82 of the 2-3 timing valve 81 is shifted to a position illustrated in the lower half, which position will be hereafter referred to as a "second position". At this valve position, the port 82d communicates with the port 82e to supply the line pressure to the path 88 therethrough. Therefore, the line pressure in the high and reverse clutch H&R/C is increased at a higher rate to cause engagement for shifting the automatic transmission at the third gear position.

Similarly to the above, this process reduces shift shock in up-shifting from the second gear position to the third gear position. Particularly, the shown arrangement is substantially effective upon up-shifting from the second gear position to the third gear position after vehicular acceleration at the second gear position.

Figures 15, 17:
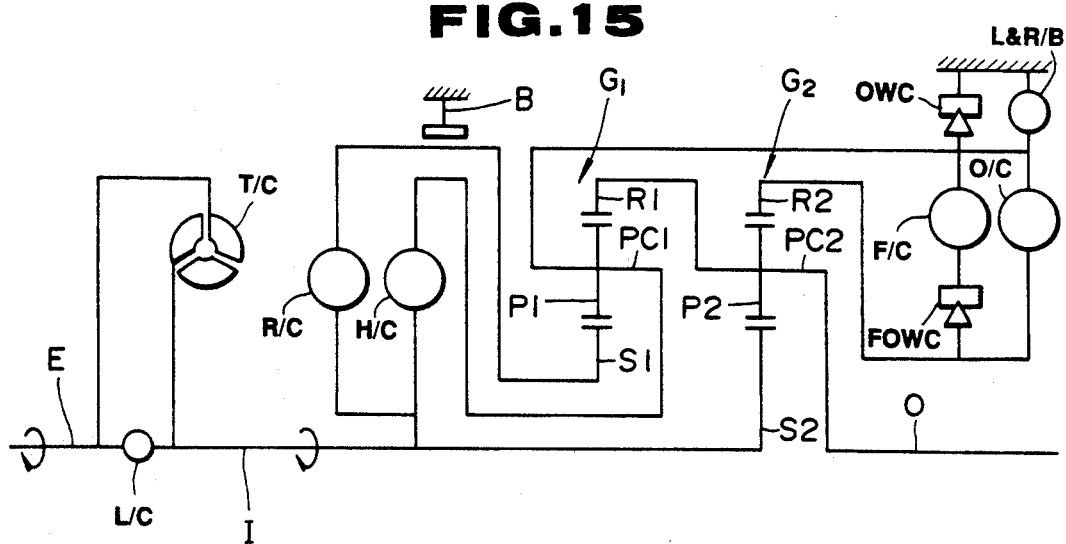
FIG. 15 is another schematic driving line diagram of another power transmission mechanism of an automatic power transmission to which the first embodiment of a automatic transmission control system according to the present invention is applied.
FIG. 17 shows a table showing the combination of components and operations of the second embodiment of the automatic transmission mechanism of FIG. 15.

FIG. 15 shows another construction of the automatic power transmission system to which the automatic transmission control system according to the present invention is applicable. The shown embodiment of the automatic transmission system has fourth gear position (over-drive gear position).

The shown power transmission mechanism is designed for shifting forward four stage gear positions and reverse gear position. The power transmission mechanism includes a torque converter T/C associated with an output shaft E of an automotive engine (not shown). An input shaft I transmits rotational torque generated by the torque converter T/C to an output shaft O for transmitting driving torque to a final drive device (not shown) via a first idler gear assembly $G_1$ and a second idler gear assembly $G_2$. The power transmission mechanism further includes a high clutch H/C, a reverse clutch R/C, a forward clutch F/C, a band brake B, an overrun clutch O/C, a low and reverse brake L&R/B, an one-way clutch OWC a forward one-way clutch FOWC. The torque converter T/C incorporates a lock-up clutch L/C. As is well known, the lock-up clutch L/C is engaged when pressure is applied to an application chamber T/A and is released when pressure is applied to a release chamber T/R.

The first idler gear assembly $G_1$ comprises a sun gear $S_1$, an internal gear $R_1$ and a pinion $P_1$ which meshes with both the sun gear $S_1$ and the internal gear $R_1$, simultaneously. The pinion $P_1$ is supported by means of a pinion carrier $PC_1$. The pinion carrier $PC_1$ can be connected to the input shaft I via a high clutch H/C. The sun gear $S_1$ can be directly connected to the input shaft I via the reverse clutch R/C. The pinion carrier $PC_1$ can also be connected to the internal gear $R_2$ via the overrun clutch O/C which is arranged parallel to the forward clutch F/C and forward one-way clutch FOWC, or, in the alternative, via the forward clutch F/C and the forward one-way clutch FOWC connected in series with the forward clutch. The second idler gear assembly $G_2$ comprises a sun gear $S_2$, an internal gear $R_2$ and a pinion $P_2$ which meshes with both the sun gear $S_2$ and the internal gear $R_2$, simultaneously. The pinion $P_2$ is supported by means of a pinion carrier $PC_2$. The sun gear $S_2$ is constantly connected to the input shaft I. On the other hand, the internal gear $R_1$ and the pinion carrier $P_2$ are constantly connected to the output shaft O. The low and reverse brake L&R/B can fix the pinion carrier $PC_1$. On the other hand, the band brake B can fix the sub gear $S_1$. One-way clutch OWC permits the pinion carrier $PC_1$ to rotate in the forward direction but prevents the pinion carrier $PC_1$ from rotating in the reverse direction. These components set forth above are arranged and associated as shown in FIG. 15.

The high and reverse clutch H&R/C, the forward clutch F/C, the band brake B, low and reverse brake L&R/B and one-way clutch OWC are cooperatively operated to control rotation of respective gears in the first and second planetary gear assemblies and whereby to control rotation speed of the output shaft O versus the rotation speed of the input shaft I to establish gear selection between three forward gear positions and reverse gear position. The forward clutch F/C, high clutch H/C, the reverse clutch R/C, the overrun clutch O/C, the forward one-way clutch FOWC and the one-way clutch OWC, and band brake B and low and reverse brake L&R/B are combined to facilitate forward four gear stage and reverse gear stage shifting for the automatic transmission, as shown in FIG. 17. In the table shown in FIG. 17, $a_1$ and $a_2$ are gear ratio between sun gears $S_1$ and $S_2$ versus the internal gears $R_1$ and $R_2$.

Figure 16:
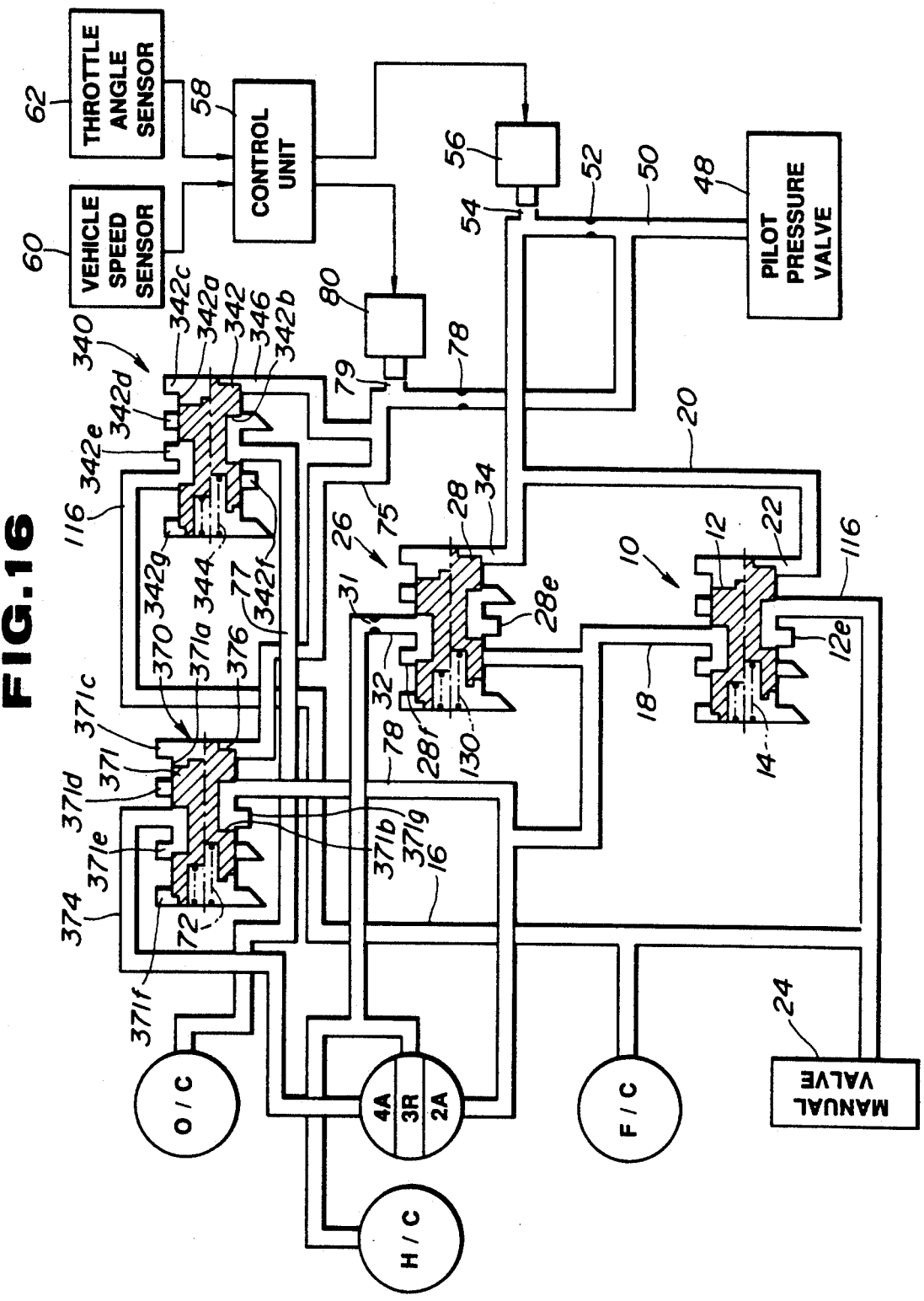
FIG. 16 is a schematic circuit diagram of the third embodiment of the automatic transmission control system.
Figure 19:
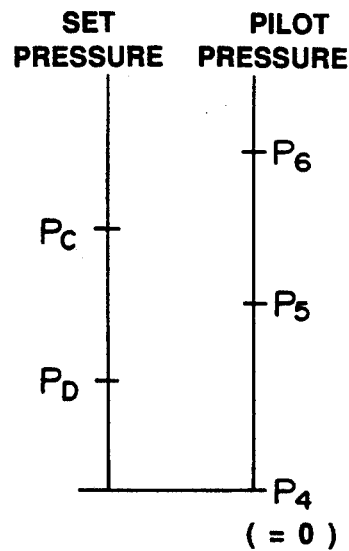

FIG. 16 shows a third embodiment of the automatic transmission control system according to the invention. The shown control system includes the 1-2 shift valve 10, the 2-3 shift valve 26 and a 3-4 shift valve 370. In addition, the shown control system is provided with an overrun clutch control valve 340. Since the 1-2 shift valve 10 and 2-3 shift valve 26 are of the identical constructions to that illustrated in the former embodiments, detailed discussion about the constructions and shift operation as governed by the solenoid valve 56 will be neglected in order to simplify the discussion for avoiding unnecessary confusion. It should be appreciated that the pilot pressure $P_4$, $P_5$ and $P_6$ and set pressure $P_C$ and $P_D$ of the 1-2 shift valve 10 and 2-3 shift valve 26 are set as shown in FIG. 19.

As will be seen from FIG. 16, the port 28e of the 2-3 shift valve 26 is connected to a release chamber 3R of the band servo device BS to establish the third gear position, and to a high clutch H/C via the path 32 with the orifice 31, which release chamber will be hereafter referred to as the "third gear release chamber". On the other hand, the port 12e of the 1-2 shift valve is connected to an application chamber 2A of the band servo device BS for establishing the second gear position via a path 18, which application chamber will be hereafter referred to as the "second gear application chamber". The port 12e is also connected to the port 28f of the 2-3 shift valve 26 and to a port 371d of the 3-4 shift valve 370. The 3-4 shift valve 370 has a port 71g connected to an application chamber 4A of the band servo device BS for establishing the fourth gear position via a path 374. On the other hand, the overrun clutch control valve 340 has a port 342e connected to the overrun clutch O/C and a port 342f connected to the manual valve 24 via a path 16a.

Figure 18:
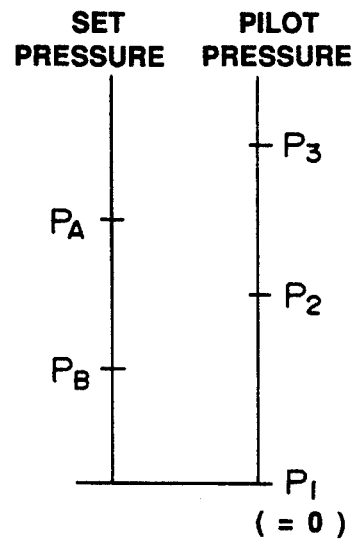
FIGS. 18 and 19 are charts showing relationship between control pressure and shift valve position and over-run clutch valve position in FIG. 18 and 2-3 shift valve position and 1-2 shift valve position in FIG. 19, in shifting between gear positions in the third embodiment of the automatic transmission control system of FIG. 16.

The 3-4 shift valve 370 and the overrun clutch control valve 340 have pilot chambers 376 and 346 connected to the pilot pressure valve 48 via a path 50 and 75, which path 75 has a pressure regulating orifice 78. The solenoid valve 80 is provided for opening and closing the port 79 of the path 75 for adjusting the pilot pressure to be applied to the pilot chambers 376 and 346. The solenoid valve 80 adjusts the pilot pressure variable between $P_1$, $P_2$ and $P_3$. These pilot pressure are so related as to set pressure $P_A$ and $P_B$ determined by set springs 344 and 372 of the overrun clutch control valve 340 and the 3-4 shift valve 370 normally exerted on valve spools 342 and 371. The relationship between the pilot pressure $P_1$, $P_2$ and $P_3$ and the set pressure $P_A$ and $P_B$ is shown in FIG. 18.

When the pilot pressure in the path 75 is $P_2$ or $P_3$ and the pilot pressure in the path 20 is $P_6$, the valve spool 371 of the 3-4 shift valve 370 is placed at a position illustrated in the upper half, which position will be hereafter referred to as, the "first position", and the valve spools 12 and 28 of the 1-2 shift valve 10 and the 2-3 shift valve 26 are both placed at the first position. At this valve position, the line pressure is blocked by the valve spool 12 of the 1-2 shift valve 10. Therefore, only forward clutch F/C is engaged to establish the first gear position.

When the pilot pressure in the path 20 is then decreased to $P_4$, the valve spools 12 and 28 of the 1-2 shift valve 10 and the 2-3 shift valve 26 are shifted to the second positions to supply the line pressure to the second gear application chamber 2A of the band servo device BS to engage the band brake B for establishing the second gear position. When the pilot pressure in the path 20 is increased to $P_5$, the valve spool 28 of the 2-3 shift valve 26 shifts to the first position to supply the line pressure to the high clutch H/C and third gear release chamber 3R of the band servo device BS to establish the third gear position.

Here, with maintaining the pilot pressure $P_5$ in the path 20, the pilot pressure of the path 75 is adjusted to $P_1$, the valve spool 371 of the 3-4 shift valve 370 is placed at the second position for supplying the line pressure to the fourth gear application chamber 4A of the band servo device BS to establish the fourth gear position.

During the shifting operation set forth above, the overrun control valve 340 varies the position of the valve spool 342 between the position illustrated in the upper half, which position will be hereafter referred to as the "first position", and the position illustrated in the lower half, which position will be hereafter referred to as the "second position". When the pilot pressure in the path 75 is $P_2$, the valve spool 342 is maintained at the second position to block the line pressure. Therefore, the overrun clutch O/C is maintained at the disengaged condition and the 3-4 shift valve 370 is maintained at the first position. Therefore, engine brake is not effective for decelerating the engine. On the other hand, when the pilot pressure in the path 75 is $P_3$, the valve spool 342 is shifted to the first position to supply the line pressure to the overrun clutch O/C and the 3-4 shift valve 370 is maintained at the first position. By this, the overrun clutch O/C is engaged to make engine brake effective at the gear ratio lower than fourth gear position.

Since the pilot pressure is controlled by the control unit 58 with taking the vehicle speed and the throttle valve angular position, engine braking is disabled at high speed condition for preventing the automatic transmission from overrunning.

FIG. 20 shows a modification of the aforementioned third embodiment of the automatic transmission control system of FIG. 16. In this embodiment, the line pressure is supplied to the overrun clutch control valve 340' via the 3-4 shift valve 370'. For this, the overrun clutch control valve 340' is connected to the 3-4 shift valve 370' via the path 73. In this case, the line pressure is supplied only when the valve spool 371' of the 3-4 shift valve 370' is shifted to the first position and the valve spool 342' of the overrun clutch control valve 340' is shifted to the second position. With the shown construction, even when the 3-4 shift valve or over-run clutch valve causes valve sticking, interlocking of the automatic transmission can be prevented.

FIG. 21 shows the fourth embodiment of the automatic transmission control system according to the invention. In this embodiment, the 1-2 shift valve 10, 2-3 shift valve 26 and a cut-back valve 440 are controlled with a common pilot pressure adjusted or generated by the solenoid valve 56.

The cut-back valve 440 has a valve spool 442 movable between a position illustrated in the upper half, which position will be referred to as "first position" and a position illustrated in the lower half, which position will be hereafter referred to as "second position". The valve spool 442 is formed with a groove 442b and is disposed within a valve bore 442a which has a plurality of annular ports 442c, 442d, 442e, 442f and 442g. The port 442c is communicated with a pilot chamber 446 and, in turn, with the pilot pressure valve 48 via a path 50 with the pressure regulating orifice 52. The port 442d is connected to a path between the manual valve 24 and the pressure regulator valve 470 via a path 33. On the other hand, the port 442e is connected to the pressure regulator valve 470 via a path 38 and a pilot port 71.

Figure 22:
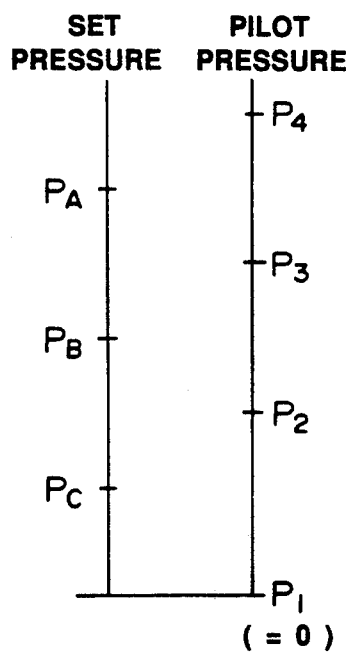
FIG. 22 is a chart showing relationship between set pressure and control pressure to get shift position and cut-back valve position in shifting between gear positions in the fourth embodiment of the automatic transmission control system of FIG. 13.

The solenoid valve 56 produces the pilot pressure variable between $P_1$, $P_2$, $P_3$ and $P_4$. On the other hand, the cut-back valve 440 is to be shifted at a set pressure $P_A$ by a set spring 444. The 2-3 shift valve 26 and the 1-2 shift valve are respectively shifted at pressure of $P_B$ and $P_C$. These pressure are related as shown in FIG. 22.

Similarly to the foregoings, the 1-2 shift valve 10 and the 2-3 shift valve 26 cooperate with each other to establish first, second and third gear positions corresponding to the pilot pressure $P_1$, $P_2$ and $P_3$ in substantially the same manner as set forth above. Namely, the pressure is set $P_4 > P_A > P_3 > P_B > P_2 > P_C > P_1$. In this case, the 1-2 shift valve is shifted at the position illustrated in the upper hald at the pressure $P_3$ and $P_4$ and at the position illustrated in the lower halh at the pressure $P_1$ and $P_2$. Similarly, the 2-3 shift valve is shifted at the position illustrated in the upper half at the pressure $P_4$, $P_3$, $P_2$ and at the position illustrated in the lower half at the pressure $P_1$.

The cut-back valve 440 is responsive to the pilot pressure in the pilot chamber 446 at $P_4$ to shift to the first position to drain the path 38. Therefore, the pressure to be applied to the pilot port 71 of the pressure regulator valve 470 becomes LOW level. The pressure regulating valve 470 is then responsive to the LOW pressure at the pilot port to adjust the line pressure to be supplied through the path 16 at the higher level. On the other hand, when the pilot pressure at the pilot chamber 446 is $P_3$, the path 38 is connected to the path 33 to apply the line pressure to the pilot port 71 of the pressure regulator valve 70. The pressure regulator valve 70 is responsive to the high level pilot pressure at the pilot port to adjust the line pressure to the lower level. Therefore, the line pressure to be supplied through the path 16 becomes the lower pressure.

When the transmission gear is shifted from the second gear position to the first gear position, the pressure is initially set at $P_3$ to cause shifting of the 1-2 shift valve at the first gear position (upper position). After an appropriate interval, pressure is set at $P_4$ to shift the cut-back valve at the upper position. By this line pressure can be increased after completing shift operation. This is effective for reducing shift shock.

As will be appreciated herefrom, according to the present invention, more than one valve can be controlled by a single solenoid valve to allow simplification of the hydraulic circuit while assuring transmission shift control, lock-up control and so forth.

Though the shown embodiments employ solenoids which are controlled by the duty cycle, those solenoids can be replaced with analog or linear solenoid. Furthermore, though the shown embodiments employ timing valves, such as 2-3 timing valve and 3-4 timing valve arranged cooperative with orifices, it is possible to neglect orifices by operating the valves to block pressure for a given period.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. In a control system for an automatic power transmission, the automatic power transmission being shiftable between a plurality of gear positions including a higher gear position and a lower gear position:

means for generating a pilot pressure;

a first valve having a first position corresponding to the higher gear position, a second position corresponding to the lower gear position, and a first signal pressure port;

a second valve having a first position which a first fluid flow path therethrough is established, a second position in which a second fluid flow path therethrough is established, and a second signal pressure port;

a hydraulic fluid path means for fluidly connecting said first and second signal pressure ports to said pilot pressure generating means, said hydraulic fluid path means including an orifice, an uninterrupted fluid flow communication between said orifice and said pilot pressure generating means, and a drain port opening fluidly disposed between said orifice and said first and second signal pressure ports, said hydraulic fluid path means providing an uninterrupted fluid flow communication between said first and second signal pressure ports and said orifice;

solenoid valve means for controlling a rate of hydraulic fluid flow out of said hydraulic fluid path means through said drain port opening;

control unit means for controlling said solenoid valve means such that said rate is variable between at least three distinct degrees whereby a hydraulic fluid pressure applied to said first and second signal pressure ports is variable between first, second, and third different levels corresponding to said three distinct degrees, respectively, said third level being higher than said second level which is in turn higher than said first level;

said first valve including a first pressure responsive means, responsive to said hydraulic fluid pressure applied to said first signal pressure port, for shifting from said first position to said second position when said hydraulic fluid pressure applied to said first signal pressure port is greater than a first predetermined value;

said second valve including a second pressure responsive means, responsive to said hydraulic fluid pressure applied to said second signal pressure port, for shifting from said first position to said second position when said hydraulic fluid pressure is greater than a second predetermined value.

2. A control system as claimed in claim 1, wherein said second valve comprises a lock-up control valve for controlling a lock-up clutch in a torque converter.

3. A control system as claimed in claim 1, wherein said second valve comprises a timing valve for controlling timing of a gear shift form the higher gear position to the lower gear position.

4. A control system as claimed in claim 1, wherein said second valve comprises an overrunning clutch control valve.

5. A control system as claimed in claim 1, wherein said second valve comprises a cut-back valve.

6. A control system for an automatic power transmission, comprising:
   a hydraulic circuit associated with a transmission gear assembly for hydraulically performing gear shifting operation at least between a higher gear position and a lower gear position;
   a first valve means disposed within said hydraulic circuit and movable between a first position corresponding to said higher gear position and a second position corresponding to said lower gear position, said first valve means being responsive to a pilot pressure in a first pilot chamber for shifting the valve position between said first and second positions according to variations of pilot pressure across a first set pressure, said first valve means being responsive to a first level pilot pressure which is lower than said first set pressure and higher than a second set pressure to select said lower gear position and to a second level pilot pressure which is higher than said first set pressure to select said higher gear position;
   a second valve means, which comprises a timing valve for controlling shift timing and which is disposed within said hydraulic circuit, for performing control of automatic transmission operations associated with transmission gear shifting operations, said second valve means being responsive to the pilot pressure in a second pilot pressure chamber for shifting between a first position activating an associated transmission component and a second position deactivating said associated transmission component according to variations of said pilot pressure varying across second set pressure, said second valve means being responsive to said first and second level pilot pressures to disable shifting from said higher gear position to said lower gear position and to a third level pilot pressure lower than said second set pressure to permit shifting from said higher gear position to said lower gear position at a higher speed; and
   third valve means for selectively generating said first, second and third level pilot pressures to be supplied to both said first and second valve means for operating said first and second valve means to desired positions.

7. An automatic transmission control system as set forth in claim 6, wherein said third valve means maintains said pilot pressure at said first level pilot pressure when decreased from said second level pilot pressure for a given period so that the transmission gear position is maintained at a neutral position for said given period or lowers an shift up speed by maintaining the pilot pressure at the second level and subsequency setting said pilot pressure at the third level.

8. An automatic transmission control system, comprising:
   a hydraulic circuit, associated with a transmission gear assembly, for hydraulically performing gear shifting operations at least between a higher gear position and a lower gear position;
   a first valve means disposed within said hydraulic circuit and movable between a first position corresponding to said higher gear position and a second position corresponding to said lower gear position, said first valve means being responsive to a pilot pressure in a first pilot chamber for shifting in the valve position between said first and second positions according to variations of pilot pressure across a first set pressure level;
   a second valve means, which comprises a timing valve for controlling shift timing and which is disposed within said hydraulic circuit, for performing control of automatic transmission operations associate with transmission gear shifting operations, said second valve means being responsive to the pilot pressure in a second pilot pressure chamber for shifting between a first position activating an associated transmission component and a second position deactivating said associated transmission component according to variations of said pilot pressure across a second set pressure level,
   said first valve means being responsive to a first pilot pressure level which is lower than said first set pressure level to select said lower gear position and to a second pilot pressure level which is higher than said first set pressure level and lower and than said second set pressure level to select said higher gear position,
   said second valve means being responsive to said first and second pilot pressure levels to disable shifting from said lower gear position to said higher gear position or to lower shift speed, and to a third level pilot pressure level higher than said second set pressure level to permit shifting from said lower gear position to said higher gear position at a higher speed; and
   third valve means for selectively generating said first, second, and third pilot pressure levels to be supplied to both said first and second valve means for operating said first and second valve means to desired positions.

9. An automatic transmission control system as set forth in claim 8, wherein said third value means maintains said pilot pressure at said second level pilot pressure when increased from said first level pilot pressure for a given period so that the transmission gear position is maintained at a neutral position during said given period.

10. A method for controlling an automatic power transmission comprising the steps of:
   providing a hydraulic circuit associated with a transmission gear assembly for hydraulically performing gear shifting operations at least between a higher gear position and a lower gear position;
   disposing a first valve means within said hydraulic circuit which is movable between a first position corresponding to said higher gear position and a second position corresponding to said lower gear position, said first valve means being responsive to a pilot pressure in a first pilot chamber for shifting of valve positions between said first and second positions according to variations of said pilot pressure across a first set pressure, said first valve means being responsive to a first level pilot pressure which is lower than said first set pressure and higher than a second set pressure to select said lower gear position and to a second level pilot pressure which is higher than said first set pressure to select said higher gear position;

disposing a timing valve within said hydraulic circuit for performing control of automatic transmission operations associated with transmission gear shifting operations, said timing valve being responsive to said pilot pressure in a second pilot pressure chamber for shifting between a first position activating an associated transmission component and a second position deactivating said associated transmission component according to variations of said pilot pressure varying across said second set pressure, said timing valve being responsive to said first and second pilot pressure levels to disable shifting from said higher gear position to said lower gear position or to lower gear shift speed and to a third level pilot pressure lower than said second set pressure to permit shifting from said higher gear position to said lower gear position at a higher speed; and selectively generating said first, second and third pilot pressure levels to be supplied to said first valve means and timing valve for operating said first valve means and timing valve to desired positions.

* * * * *